(12) United States Patent
Bedikian et al.

(10) Patent No.: US 9,911,240 B2
(45) Date of Patent: *Mar. 6, 2018

(54) SYSTEMS AND METHOD OF INTERACTING WITH A VIRTUAL OBJECT

(71) Applicant: Leap Motion, Inc., San Francisco, CA (US)

(72) Inventors: Raffi Bedikian, San Francisco, CA (US); Hongyuan (Jimmy) He, San Francisco, CA (US); David S. Holz, San Francisco, CA (US)

(73) Assignee: Leap Motion, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/678,896

(22) Filed: Aug. 16, 2017

(65) Prior Publication Data

US 2017/0345218 A1 Nov. 30, 2017

Related U.S. Application Data

(63) Continuation of application No. 14/626,683, filed on Feb. 19, 2015, now Pat. No. 9,767,613.

(Continued)

(51) Int. Cl.
| | |
|---|---|
| *G06T 11/60* | (2006.01) |
| *G06T 19/00* | (2011.01) |
| *G09G 5/14* | (2006.01) |
| *G06F 3/0484* | (2013.01) |
| *G06F 3/00* | (2006.01) |
| *G06F 3/01* | (2006.01) |
| *G06F 3/0488* | (2013.01) |
| *G06F 3/0481* | (2013.01) |

(52) U.S. Cl.
CPC ............ *G06T 19/006* (2013.01); *G06F 3/002* (2013.01); *G06F 3/017* (2013.01); *G06F 3/0488* (2013.01); *G06F 3/04815* (2013.01); *G06F 3/04845* (2013.01); *G06T 11/60* (2013.01); *G09G 5/14* (2013.01)

(58) Field of Classification Search
CPC ......... G06T 11/60; G06T 19/006; G09G 5/14; G06F 3/016; A63F 13/10
USPC .............. 345/619, 629–641, 156; 463/31, 32
See application file for complete search history.

(56) References Cited

U.S. PATENT DOCUMENTS

| | | |
|---|---|---|
| 2010/0177035 A1 | 7/2010 | Schowengerdt et al. |
| 2014/0240225 A1 | 8/2014 | Eilat |

(Continued)

OTHER PUBLICATIONS

U.S. Appl. No. 14/626,683—Office Action dated Jan. 20, 2016, 15 pages.

(Continued)

*Primary Examiner* — Ke Xiao
*Assistant Examiner* — Andrew Shin
(74) *Attorney, Agent, or Firm* — Haynes Beffel & Wolfeld LLP; Ernest J. Beffel, Jr.; Andrew L. Dunlap

(57) ABSTRACT

The technology disclosed relates to a method of interacting with a virtual object. In particular, it relates to referencing a virtual object in an augmented reality space, identifying a physical location of a device in at least one image of the augmented reality space, generating for display a control coincident with a surface of the device, sensing interactions between at least one control object and the control coincident with the surface of the device, and generating data signaling manipulations of the control coincident with the surface of the device.

22 Claims, 23 Drawing Sheets

Related U.S. Application Data

(60) Provisional application No. 62/107,345, filed on Jan. 23, 2015.

(56) References Cited

U.S. PATENT DOCUMENTS

| | | |
|---|---|---|
| 2014/0248950 A1 | 9/2014 | Tosas Bautista |
| 2014/0364209 A1 | 12/2014 | Perry |
| 2015/0016777 A1 | 1/2015 | Abovitz et al. |
| 2015/0205358 A1 | 7/2015 | Lyren |
| 2015/0205400 A1 | 7/2015 | Hwang et al. |
| 2015/0309629 A1 | 10/2015 | Amariutei et al. |

OTHER PUBLICATIONS

U.S. Appl. No. 14/626,683—Response to Office Action dated Jan. 20, 2016 filed May 20, 2016, 15 pages.
U.S. Appl. No. 14/626,683—Final Office Action dated Sep. 12, 2016, 21 pages.
U.S. Appl. No. 14/626,683—Response to Final Office Action dated Sep. 12, 2016, filed Jan. 12, 2017, 13 pages.
U.S. Appl. No. 14/626,683—Advisory Action dated Feb. 10, 2017, 8 pages.
U.S. Appl. No. 14/626,683—Response to Advisory Action dated Feb. 10, 2017, filed Feb. 13, 2017, 19 pages.
U.S. Appl. No. 14/626,683—Nonfinal Action dated Mar. 31, 2017, 21 pages.
U.S. Appl. No. 14/626,683—Response to Nonfinal Action dated Mar. 31, 2017, filed Apr. 7, 2017, 10 pages.
U.S. Appl. No. 14/626,683—Notice of Allowance dated May 19, 2017, 8 pages.

SYSTEMS AND METHOD OF INTERACTING WITH A VIRTUAL OBJECT

PRIORITY DATA

This application is a continuation of U.S. Non-Provisional application Ser. No. 14/626,683, entitled "SYSTEMS AND METHODS OF INTERACTING WITH A VIRTUAL OBJECT", filed 19 Feb. 2015, now U.S. Pat. No. 9,767,613, issued Sep. 19, 2017, and which claims the benefit of U.S. Provisional Patent Application No. 62/107,345, entitled, "SYSTEMS AND METHODS OF INTERACTING WITH A VIRTUAL OBJECT", filed 23 Jan. 2015. The provisional application is hereby incorporated by reference for all purposes.

INCORPORATIONS

Materials incorporated by reference in this filing include the following:

"SYSTEMS AND METHODS OF CREATING A REALISTIC GRAB EXPERIENCE IN VIRTUAL REALITY/AUGMENTED REALITY ENVIRONMENTS", U.S. application Ser. No. 14/626,898 filed contemporaneously.

"SYSTEMS AND METHODS OF PROVIDING HAPTIC-LIKE FEEDBACK IN THREE-DIMENSIONAL (3D) SENSORY SPACE", U.S. Prov. App. No. 61/937,410, filed 7 Feb. 2014, "SYSTEMS AND METHODS OF INTERACTING WITH VIRTUAL REALITY AND AUGMENTED REALITY ENVIRONMENTS USING FREE-FORM IN-AIR GESTURES", U.S. Non Prov. application Ser. No. 14/620,183, filed 11 Feb. 2015, "SYSTEMS AND METHODS OF INTERACTING WITH A VIRTUAL GRID IN A THREE-DIMENSIONAL (3D) SENSORY SPACE", U.S. Prov. App. No. 62/007,885, filed 4 Jun. 2014, "SYSTEMS AND METHODS OF GESTURAL INTERACTION IN A PERVASIVE COMPUTING ENVIRONMENT", U.S. Prov. App. No. 62/003,298, filed 27 May 2014, "INITIALIZING ORIENTATION IN SPACE FOR PREDICTIVE INFORMATION FOR FREE SPACE GESTURE CONTROL AND COMMUNICATION", U.S. Nonprovisional. application Ser. No. 14/590,983, filed 6 Jan. 2015, "ADAPTER FOR ATTACHING A MOTION CAPTURE DEVICE TO A HEAD MOUNTED DISPLAY", U.S. Prov. App. No. 61/991,337, filed 9 May 2014, "CONTACTLESS CURSOR CONTROL USING FREE-SPACE MOTION DETECTION," U.S. Prov. App. No. 61/825,515, filed 20 May 2013, "PREDICTIVE INFORMATION FOR FREE SPACE GESTURE CONTROL AND COMMUNICATION," U.S. Prov. App. No. 61/871,790, filed 29 Aug. 2013, "PREDICTIVE INFORMATION FOR FREE-SPACE GESTURE CONTROL AND COMMUNICATION," U.S. Prov. App. No. 61/873,758, filed 4 Sep. 2013, "PREDICTIVE INFORMATION FOR FREE SPACE GESTURE CONTROL AND COMMUNICATION," U.S. Non. Prov. application Ser. No. 14/474,077, filed 29 Aug. 2014, "VELOCITY FIELD INTERACTION FOR FREE SPACE GESTURE INTERFACE AND CONTROL," U.S. Prov. App. No. 61/891,880, filed 16 Oct. 2013, "VELOCITY FIELD INTERACTION FOR FREE SPACE GESTURE INTERFACE AND CONTROL," U.S. Non. Prov. application Ser. No. 14/516,493, filed 16 Oct. 2014, "VIRTUAL INTERACTIONS FOR MACHINE CONTROL," U.S. Prov. App. No. 61/897,186, filed 29 Oct. 2013, "VIRTUAL INTERACTIONS FOR MACHINE CONTROL," U.S. Non Prov. application Ser. No. 14/527,742, filed 29 Oct. 2014, "INTERACTIONS WITH VIRTUAL OBJECTS FOR MACHINE CONTROL," U.S. Prov. App. No. 61/898,464, filed 31 Oct. 2013, "INTERACTIONS WITH VIRTUAL OBJECTS FOR MACHINE CONTROL," U.S. Non Prov. application Ser. No. 14/530,364, filed 31 Oct. 2014, "PREDICTIVE INFORMATION FOR FREE SPACE GESTURE CONTROL AND COMMUNICATION," U.S. Prov. App. No. 61/898,462, filed 31 Oct. 2013, "IMPROVING PREDICTIVE INFORMATION FOR FREE SPACE GESTURE CONTROL AND COMMUNICATION," U.S. Non Prov. application Ser. No. 14/530,690, filed 31 Oct. 2014, "INTERACTION STRENGTH USING VIRTUAL OBJECTS FOR MACHINE CONTROL," U.S. Prov. App. No. 61/905,103, filed 15 Nov. 2013, "INTERACTION STRENGTH USING VIRTUAL OBJECTS FOR MACHINE CONTROL," U.S. Non Prov. application Ser. No. 14/541,078, filed 13 Nov. 2014, "VEHICLE MOTION SENSORY CONTROL," U.S. Prov. App. No. 62/005,981, filed 30 May 2014, "FREE-SPACE USER INTERFACE AND CONTROL USING VIRTUAL CONSTRUCTS," U.S. Non. Prov. application Ser. No. 14/154,730, filed 14 Jan. 2014, "FREE-SPACE USER INTERFACE AND CONTROL USING VIRTUAL CONSTRUCTS," U.S. Prov. App. No. 61/873,351, filed 3 Sep. 2013, "FREE-SPACE USER INTERFACE AND CONTROL USING VIRTUAL CONSTRUCTS," U.S. Prov. App. No. 61/877,641, filed 13 Sep. 2013, "SYSTEMS AND METHODS FOR MACHINE CONTROL," U.S. Non. Prov. application Ser. No. 14/280,018, filed 16 May 2014, "DYNAMIC, FREE-SPACE USER INTERACTIONS FOR MACHINE CONTROL," U.S. Non. Prov. application Ser. No. 14/155,722, filed 15 Jan. 2014, "SYSTEMS AND METHODS FOR CAPTURING MOTION IN THREE-DIMENSIONAL SPACE," U.S. Prov. App. No. 61/724,091, filed 8 Nov. 2012, "MOTION CAPTURE USING CROSS-SECTIONS OF AN OBJECT," U.S. application Ser. No. 13/414,485, filed 7 Mar. 2012, "SYSTEM AND METHODS FOR CAPTURING MOTION IN THREE-DIMENSIONAL SPACE," U.S. application Ser. No. 13/742,953, filed 16 Jan. 2013, "INITIALIZING PREDICTIVE INFORMATION FOR FREE SPACE GESTURE CONTROL AND COMMUNICATION," U.S. Non. Prov. application Ser. No. 14/560,923, filed 4 Dec. 2014, "SAFETY FOR WEARABLE VIRTUAL REALITY DEVICES VIA OBJECT DETECTION AND TRACKING," U.S. Prov. App. No. 61/981,162, filed 17 Apr. 2014, and "BIOMETRIC AWARE OBJECT DETECTION AND TRACKING," U.S. Prov. App. No. 61/952,843, filed 13 Mar. 2014.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Augmented Reality (AR) technology refers to the real time registration of 2D or 3D computer generated imagery onto a live view of a real world physical space. A user is able to view and interact with the augmented imagery in such a way as to manipulate the virtual objects in their view.

However, existing human-AR systems interactions are very limited and unfeasible. Current AR systems are complex as they force the user to interact with AR environment using a keyboard and mouse, or a vocabulary of simply hand gestures. Further, despite strong academic and commercial interest in AR systems, AR systems continue to be costly and requiring expensive equipment, and thus stand unsuitable for general use by the average consumer.

An opportunity arises to provide an economical approach that provides advantages of AR for enhanced and sub-millimeter precision interaction with virtual objects without the draw backs of attaching or deploying specialized hardware.

BRIEF DESCRIPTION OF THE APPENDIX

The application disclosed has been filed with an "Appendix 1". The images in Appendix 1 should be relied upon based on the coloring scheming used in them at the filing, as the information in the images is not readily conveyed by line drawings.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DESCRIPTION

Figure 1:
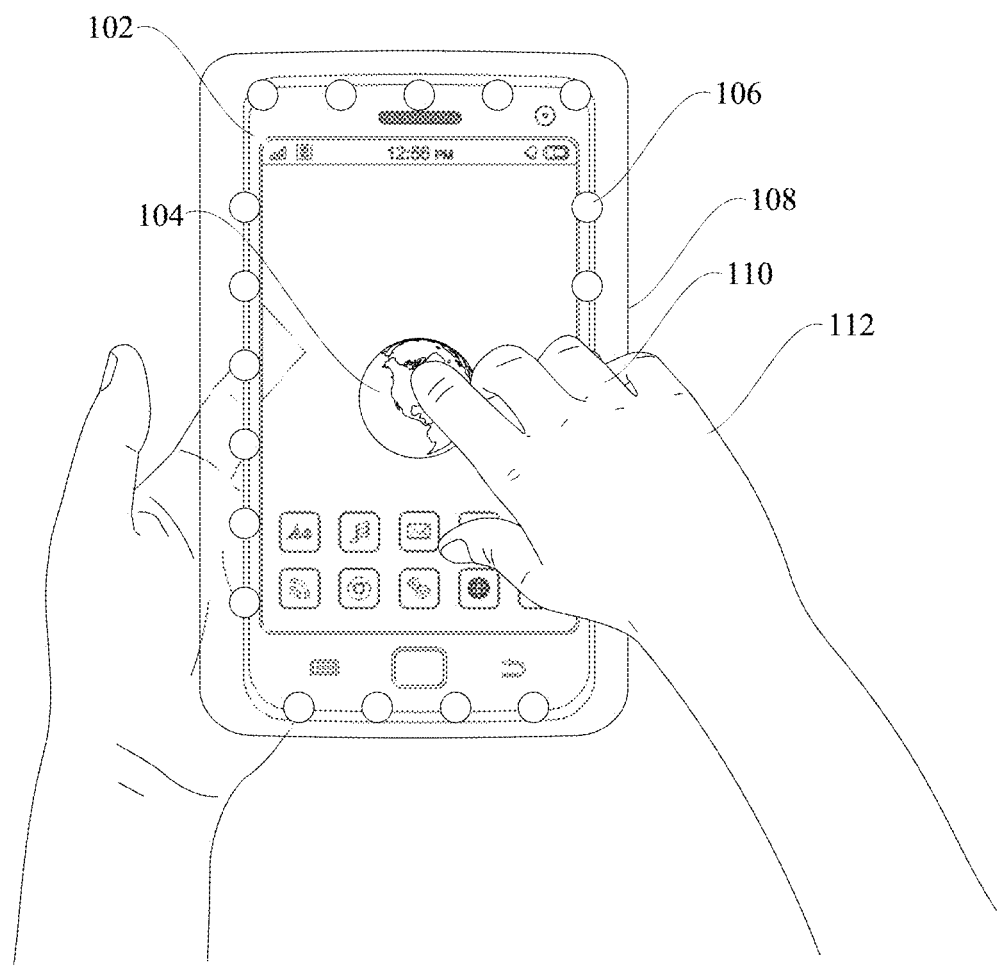
FIG. 1 illustrates one implementation of a smart phone device with a virtual control that can be used to manipulate a virtual object in an augmented reality space and/or a virtual reality space.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The traditional paradigms of indirect interactions through standard input devices such as mouse, keyboard, or stylus have their limitations, including skewed fields of view and restrictively receptive interfaces. Particularly in the VR/AR context, such traditional paradigms greatly diminish the user experience. Accordingly, the technology disclosed allows users to interact with the virtual interfaces generated in VR/AR environment using free-form in-air gestures.

However, existing human-VR/AR systems interactions are very limited and unfeasible. Current VR/AR systems are complex as they force the user to interact with VR/AR environment using a keyboard and mouse, or a vocabulary of simply hand gestures. Further, despite strong academic and commercial interest in VR/AR systems, VR/AR systems continue to be costly and requiring expensive equipment, and thus stand unsuitable for general use by the average consumer.

An opportunity arises to provide an economical approach that provides advantages of VR/AR for enhanced and sub-millimeter precision interaction with virtual objects without the draw backs of attaching or deploying specialized hardware.

System and methods in accordance herewith generally utilize information about the motion of a control object, such as a user's hand, finger or a stylus, in three-dimensional (3D) space to operate a physical or virtual user interface and/or components thereof based on the motion information. Various implementations take advantage of motion-capture technology to track the motions of the control object in real time (or near real time, i.e., sufficiently fast that any residual lag between the control object and the system's response is unnoticeable or practically insignificant). Other implementations can use synthetic motion data (e.g., generated by a computer game) or stored motion data (e.g., previously captured or generated). References to motions in "free-form in-air", "free-space", "in-air", or "touchless" motions or gestures are used herein with reference to an implementation to distinguish motions tied to and/or requiring physical contact of the moving object with a physical surface to effect input; however, in some applications, the control object can contact a physical surface ancillary to providing input, in such case the motion is still considered a "free-form in-air" motion.

Examples of "free-form in-air" gestures include raising an arm, or making different poses using hands and fingers (e.g., 'one finger point', 'one finger click', 'two finger point', 'two finger click', 'prone one finger point', 'prone one finger click', 'prone two finger point', 'prone two finger click', 'medial one finger point', 'medial two finger point') to indicate an intent to interact. In other implementations, a point and grasp gesture can be used to move a cursor on a display of a device. In yet other implementations, "free-form" gestures can be a grip-and-extend-again motion of two fingers of a hand, grip-and-extend-again motion of a finger of a hand, holding a first finger down and extending a second finger, a flick of a whole hand, flick of one of individual fingers or thumb of a hand, flick of a set of bunched fingers or bunched fingers and thumb of a hand, horizontal sweep, vertical sweep, diagonal sweep, a flat hand with thumb parallel to fingers, closed, half-open, pinched, curled, fisted, mime gun, okay sign, thumbs-up, ILY sign, one-finger point, two-finger point, thumb point, pinkie point, flat-hand hovering (supine/prone), bunged-fingers hovering, or swirling or circular sweep of one or more fingers and/or thumb and/arm.

Further, in some implementations, a virtual environment can be defined to co-reside at or near a physical environment. For example, a virtual touch screen can be created by defining a (substantially planar) virtual surface at or near the screen of a display, such as an HMD, television, monitor, or the like. A virtual active table top can be created by defining a (substantially planar) virtual surface at or near a table top convenient to the machine receiving the input.

Among other aspects, implementations can enable quicker, crisper gesture based or "free-form in-air" (i.e., not requiring physical contact) interfacing with a variety of machines (e.g., a computing systems, including HMDs, smart phones, desktop, laptop, tablet computing devices, special purpose computing machinery, including graphics processors, embedded microcontrollers, gaming consoles, audio mixers, or the like; wired or wirelessly coupled networks of one or more of the foregoing, and/or combinations thereof), obviating or reducing the need for contact-based input devices such as a mouse, joystick, touch pad, or touch screen.

Implementations of the technology disclosed also relate to methods and systems that facilitate free-form in-air gestural interactions in a virtual reality (VR) and augmented reality (AR) environment. The technology disclosed can be applied to solve the technical problem of how the user interacts with the virtual screens, elements, or controls displayed in the VR/AR environment. Existing VR/AR systems restrict the user experience and prevent complete immersion into the real world by limiting the degrees of freedom to control virtual objects. Where interaction is enabled, it is coarse, imprecise, and cumbersome and interferes with the user's natural movement. Such considerations of cost, complexity and convenience have limited the deployment and use of AR technology.

The systems and methods described herein can find application in a variety of computer-user-interface contexts, and can replace mouse operation or other traditional means of user input as well as provide new user-input modalities. Free-form in-air control object motions and virtual-touch recognition can be used, for example, to provide input to commercial and industrial legacy applications (such as, e.g., business applications, including Microsoft Outlook™; office software, including Microsoft Office™, Windows™, Excel™, etc.; graphic design programs; including Microsoft Visio™ etc.), operating systems such as Microsoft Windows™; web applications (e.g., browsers, such as Internet Explorer™); other applications (such as e.g., audio, video, graphics programs, etc.), to navigate virtual worlds (e.g., in video games) or computer representations of the real world (e.g., Google Street View™), or to interact with three-dimensional virtual objects (e.g., Google Earth™). In some implementations, such applications can be run on HMDs or other portable computer devices and thus can be similarly interacted with using the free-form in-air gestures.

A "control object" or "object" as used herein with reference to an implementation is generally any three-dimensionally movable object or appendage with an associated position and/or orientation (e.g., the orientation of its longest axis) suitable for pointing at a certain location and/or in a certain direction. Control objects include, e.g., hands, fingers, feet, or other anatomical parts, as well as inanimate objects such as pens, styluses, handheld controls, portions thereof, and/or combinations thereof. Where a specific type of control object, such as the user's finger, is used hereinafter for ease of illustration, it is to be understood that, unless otherwise indicated or clear from context, any other type of control object can be used as well.

A "virtual environment," may also referred to as a "virtual construct," "virtual touch plane," or "virtual plane," as used herein with reference to an implementation denotes a geometric locus defined (e.g., programmatically) in space and useful in conjunction with a control object, but not corresponding to a physical object; its purpose is to discriminate between different operational modes of the control object (and/or a user-interface element controlled therewith, such as a cursor) based on whether the control object interacts the virtual environment. The virtual environment, in turn, can be, e.g., a virtual environment (a plane oriented relative to a tracked orientation of the control object or an orientation of a screen displaying the user interface) or a point along a line or line segment extending from the tip of the control object.

Using the output of a suitable motion-capture system or motion information received from another source, various implementations facilitate user input via gestures and motions performed by the user's hand or a (typically handheld) pointing device. For example, in some implementations, the user can control the position of a cursor and/or other object on the interface of an HMD by with his index finger in the physical environment outside the HMD's virtual environment, without the need to touch the screen. The position and orientation of the finger relative to the HMD's interface, as determined by the motion-capture system, can be used to manipulate a cursor symbol. As will be readily apparent to one of skill in the art, many other ways of mapping the control object position and/or orientation onto a screen location can, in principle, be used; a particular mapping can be selected based on considerations such as, without limitation, the requisite amount of information about the control object, the intuitiveness of the mapping to the user, and the complexity of the computation. For example, in some implementations, the mapping is based on intersections with or projections onto a (virtual) plane defined relative to the camera, under the assumption that the HMD interface is located within that plane (which is correct, at least approximately, if the camera is correctly aligned relative to the screen), whereas, in other implementations, the screen location relative to the camera is established via explicit calibration (e.g., based on camera images including the screen).

Aspects of the system and methods, described herein provide for improved machine interface and/or control by interpreting the motions (and/or position, configuration) of one or more control objects or portions thereof relative to one or more virtual environments defined (e.g., programmatically) disposed at least partially within a field of view of an image-capture device. In implementations, the position, orientation, and/or motion of control object(s) (e.g., a user's finger(s), thumb, etc.; a suitable hand-held pointing device such as a stylus, wand, or some other control object; portions and/or combinations thereof) are tracked relative to the virtual environment to facilitate determining whether an intended free-form in-air gesture has occurred. Free-form in-air gestures can include engaging with a virtual control (e.g., selecting a button or switch), disengaging with a virtual control (e.g., releasing a button or switch), motions that do not involve engagement with any virtual control (e.g., motion that is tracked by the system, possibly followed by a cursor, and/or a single object in an application or the like), environmental interactions (i.e., gestures to direct an environment rather than a specific control, such as scroll up/down), special-purpose gestures (e.g., brighten/darken screen, volume control, etc.), as well as others or combinations thereof.

Free-form in-air gestures can be mapped to one or more virtual controls, or a control-less screen location, of a display device associated with the machine under control, such as an HMD. Implementations provide for mapping of movements in three-dimensional (3D) space conveying control and/or other information to zero, one, or more controls. Virtual controls can include imbedded controls (e.g., sliders, buttons, and other control objects in an application), or environmental-level controls (e.g., windowing controls, scrolls within a window, and other controls affecting the control environment). In implementations, virtual controls can be displayable using two-dimensional (2D) presentations (e.g., a traditional cursor symbol, cross-hairs, icon, graphical representation of the control object, or other displayable object) on, e.g., one or more display screens, and/or 3D presentations using holography, projectors, or other mechanisms for creating 3D presentations. Presentations can also be audible (e.g., mapped to sounds, or other mechanisms for conveying audible information) and/or haptic.

As used herein, a given signal, event or value is "responsive to" a predecessor signal, event or value of the predecessor signal, event or value influenced by the given signal, event or value. If there is an intervening processing element, step or time period, the given signal, event or value can still be "responsive to" the predecessor signal, event or value. If the intervening processing element or step combines more than one signal, event or value, the signal output of the processing element or step is considered "responsive to" each of the signal, event or value inputs. If the given signal, event or value is the same as the predecessor signal, event or value, this is merely a degenerate case in which the given signal, event or value is still considered to be "responsive to" the predecessor signal, event or value. "Responsiveness" or "dependency" or "basis" of a given signal, event or value upon another signal, event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

Among other aspects, the technology described herein with reference to example implementations can provide for automatically (e.g., programmatically) cancelling out motions of a movable sensor configured to capture motion and/or determining the path of an object based on imaging, acoustic or vibrational waves. Implementations can enable gesture detection, virtual reality and augmented reality, and other machine control and/or machine communications applications using portable devices, e.g., head mounted displays (HMDs), wearable goggles, watch computers, smartphones, and so forth, or mobile devices, e.g., autonomous and semi-autonomous robots, factory floor material handling systems, autonomous mass-transit vehicles, automobiles (human or machine driven), and so forth, equipped with suitable sensors and processors employing optical, audio or vibrational detection. In some implementations, projection techniques can supplement the sensory based tracking with presentation of virtual (or virtualized real) objects (visual, audio, haptic, and so forth) created by applications loadable to, or in cooperative implementation with, the HMD or other device to provide a user of the device with a personal virtual experience (e.g., a functional equivalent to a real experience).

Some implementations include optical image sensing. For example, a sequence of images can be correlated to construct a 3-D model of the object, including its position and shape. A succession of images can be analyzed using the same technique to model motion of the object such as free-form gestures. In low-light or other situations not conducive to optical imaging, where free-form gestures cannot be recognized optically with a sufficient degree of reliability, audio signals or vibrational waves can be detected and used to supply the direction and location of the object as further described herein.

Virtual Control

FIG. 1 illustrates one implementation 100 of a smart phone device 102 with a virtual control 104 that can be used to manipulate a virtual object in an augmented reality space and/or a virtual reality space.

Augmented reality (AR) generation system 1206 includes a number of components for generating the AR environment described in this application. The first component is a camera such as cameras 1202 or 1204 or other video input to generate a digitized video image of the real world or user-interaction region. The camera can be any digital device that is dimensioned and configured to capture still or motion pictures of the real world and to convert those images to a digital stream of information that can be manipulated by a computer. For example, cameras 1202 or 1204 can be digital still cameras, digital video cameras, web cams, head-mounted displays, phone cameras, tablet personal computers, ultra-mobile personal computers, and the like.

An augmented reality (AR) generation system 1224 (described later in this application) can generate for display the virtual control 104 automatically or in response to trigger events. For example, the virtual control 104 may only appear when the user selects an icon or invokes an application presented across the smart phone device 102. In other implementations, the virtual control 104 can be generated using a series of unique real world markers. The markers can be of any design, including a circular, linear, matrix, variable bit length matrix, multi-level matrix, black/white (binary), gray scale patterns, and combinations thereof. The markers can be two-dimensional or three-dimensional. The markers can be two- or three-dimensional barcodes, or two- or three-dimensional renderings of real world, three-dimensional objects. For example, the markers can be thumbnail images of the virtual images that are matched to the markers. The marker can also be an image of a real world item which the software has been programmed to recognize. So, for example, the software can be programmed to recognize a smart phone or other item from a video stream of a book. The software then superimposes the virtual control 104 in place of the smart phone device 102, such that the virtual control 104 is on a virtual plane 108 that is coincident with a surface of the smart phone device 102. Each unique real world marker can correspond to a different virtual control 104, or a quality of a virtual control 104 (e.g. the control's color, texture, opacity, adhesiveness, etc.) or both the virtual control 104 itself and all (or a subset) of the qualities of the virtual control 104.

The AR generation system 106 further uses an AR library 1358 that serves as an image repository or database of interactive virtual objects, a computer 1300 that can selectively search and access the library 1358, and a display 1302 (embedded within the smart phone device 102 or within a virtual reality headset 2302) or a projector, that is dimensioned and configured to display the real world digital image captured by a camera, as well as the virtual control 104 retrieved from the AR library 1358. In some implementations, computer 1300 includes a search and return engine that links each unique real world marker to a corresponding virtual control 104 in the AR library 1358.

In operation, a camera (e.g. 1102, 1202, 1204) returns a digital video stream of the real world, including images of one or more of the markers described previously. Image samples are taken from the video stream and passed to the computer 1300 for processing. The search and return engine then searches the AR library 1358 for the virtual control 104 that corresponds to the marker images contained in the digital video stream of the real world. Once a match is made between a real world marker contained in the digital video stream and the AR library 1358, the AR library 1358 returns the virtual control 104, its qualities, and its orientation for display across the virtual plane 108. The virtual control 104 is then superimposed upon the real world image or upon the smart phone device 102 that comprises a digital marker in the form of a quick response (QR) code, according to one example. The virtual control 104 is then placed into the real world image registration with its corresponding marker. In other implementations, multiple markers can be used to position and orient a single virtual control.

In yet other implementations, a "markerless" AR experience can be generated by identifying features of the surrounding real-world physical environment via sensors such as gyroscopes, accelerometers, compasses, and GPS data such as coordinates.

Projected AR allows users to simultaneously view the real word physical space and the virtual control 104 superimposed in the space. In one implementation, the virtual control 104 can be projected on to the real word physical space using micro-projectors embedded in wearable goggle or other head mounted display (HMD) that cast a perspective view of a stereoscopic 3D imagery onto the real world space (e.g. 2302). In such an implementation, a camera, in-between the micro-projectors can scan for infrared identification markers placed in the real world space. The camera can use these markers to precisely track the user's head position and orientation in the real word physical space, according to another implementation. Yet another implementation includes using retro-reflectors in the real word physical space to prevent scattering of light emitted by the micro-projectors and to provision multi-user participation by maintaining distinct and private user views. In such an implementation, multiple users can simultaneously interact with the same virtual control 104 or with virtual controls that manipulate the same virtual object, such that both the users view the same virtual objects and manipulations to virtual objects by one user are seen by the other user, hence creating a collaborative environment.

In other implementations, projected AR obviates the need of using wearable hardware such as goggles and other hardware like displays to create an AR experience. In such implementations, a video projector, volumetric display device, holographic projector, and/or heads-up display can be used to create a "glasses-free" AR environment. See e.g., holographic chip projectors available from Ostendo, a company headquartered in Carlsbad, Calif. (http://online.wsj.com/articles/new-chip-to-bring-holograms-to-smart-phones-1401752938). In one implementation, such projectors can be electronically coupled to user computing devices such as smart phones 102 and can be configured to produce and magnify virtual control 104 and/or virtual object 302 that are perceived as being overlaid on the real word physical space.

The third component is a control and image-processing system 106, which captures a series of sequentially temporal images of a region of interest 1212. It further identifies any gestures performed in the region of interest 1212 or objects in the region of interest 1212 and controls responsiveness of the rendered 3D virtual imagery to the performed gestures by updating the 3D virtual imagery based on the corresponding gestures.

Figure 2:
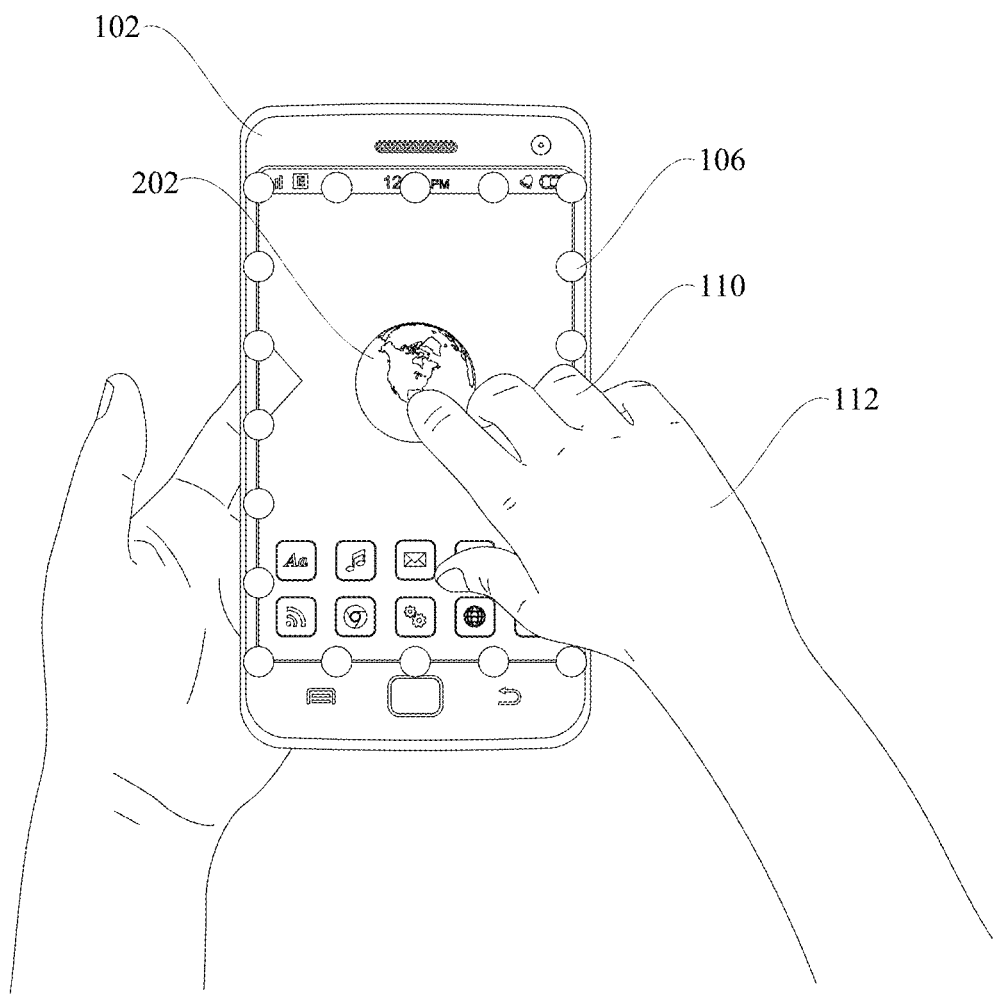
FIG. 2 depicts one implementation of a smart phone device with an interface control that can be used to manipulate a virtual object in an augmented reality space and/or a virtual reality space.

FIG. 2 depicts one implementation 200 of a smart phone device 102 with an interface control 202 that can be used to manipulate a virtual object in an augmented reality space and/or a virtual reality space. In FIG. 2, the interface control 202 is a digital screen object embedded into the smart phone device 102 and presented across its screen. In one implementation, the interface control 202 can be part of a graphical world space defined in an application program executing on the smart phone device 102. The interface control 202 can be manipulated in response to user input signals received from the touch screen in the smart phone device 102 and/or other traditional input channels such as a tool (stylus), voice, and gaze.

Figure 3:
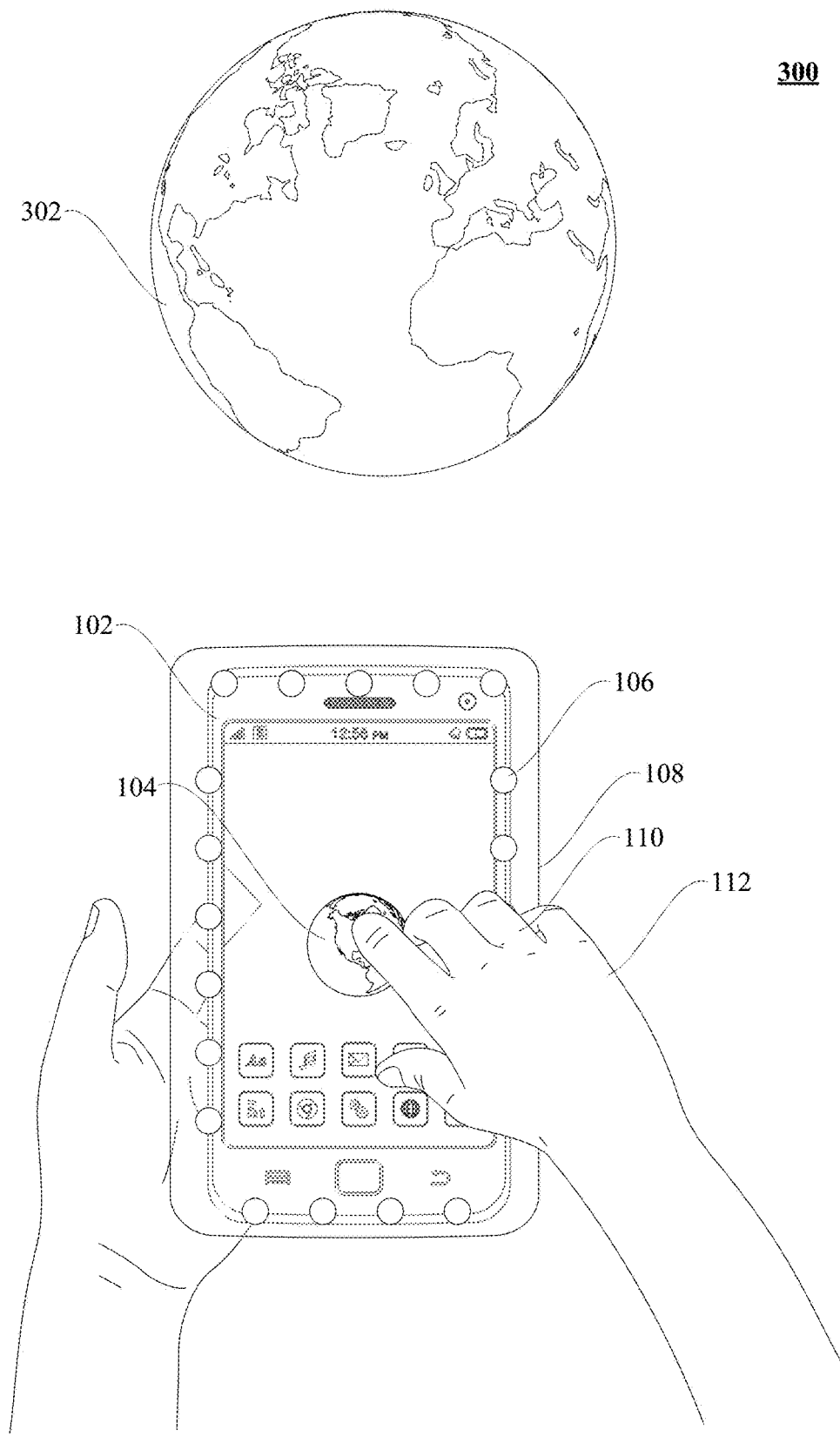
FIG. 3 shows one implementation of instantiating a virtual object in an augmented reality space and/or a virtual reality space using a virtual control of a smart phone device.

FIG. 3 shows one implementation 300 of instantiating a virtual object 302 in an augmented reality space and/or a virtual reality space using a virtual control 104 of a smart phone device 102. In FIG. 3. the virtual object 302 is a representation of planet Earth. Other implementations include the virtual object 302 representing other and/or different real world products such as furniture (chairs, couches, tables, etc.), kitchen appliances (stoves, refrigerators, dishwashers, etc.), office appliances (copy machines, fax machines, computers), consumer and business electronic devices (telephones, scanners, etc.), furnishings (pictures, wall hangings, sculpture, knick knacks, plants), fixtures (chandeliers and the like), cabinetry, shelving, floor coverings (tile, wood, carpets, rugs), wall coverings, paint colors, surface textures, countertops (laminate, granite, synthetic countertops), electrical and telecommunication jacks, audio-visual equipment, speakers, hardware (hinges, locks, door pulls, door knobs, etc.), exterior siding, decking, windows, shutters, shingles, banisters, newels, hand rails, stair steps, landscaping plants (trees, shrubs, etc.), and the like, and qualities of all of these (e.g. color, texture, finish, etc.).

In some implementations, a user can manipulate the virtual control 104 using various natural interface gestures. For instance, the user can raise an arm, utter a verbal command, perform an optical command, or make different poses using hands and fingers (e.g., 'one finger point', 'one finger click', 'two finger point', 'two finger click', 'prone one finger point', 'prone one finger click', 'prone two finger point', 'prone two finger click', 'medial one finger point', 'medial two finger point') to indicate an intent to interact with the virtual control 104, which in turn manipulates the virtual object 302. In other implementations, a point and grasp gesture can be used to move the virtual control 104, verbal commands can be used to select the virtual control 104, eye movements can be used to move the virtual control 104, and blinking can indicate a selection of the virtual control 104.

Figure 4:
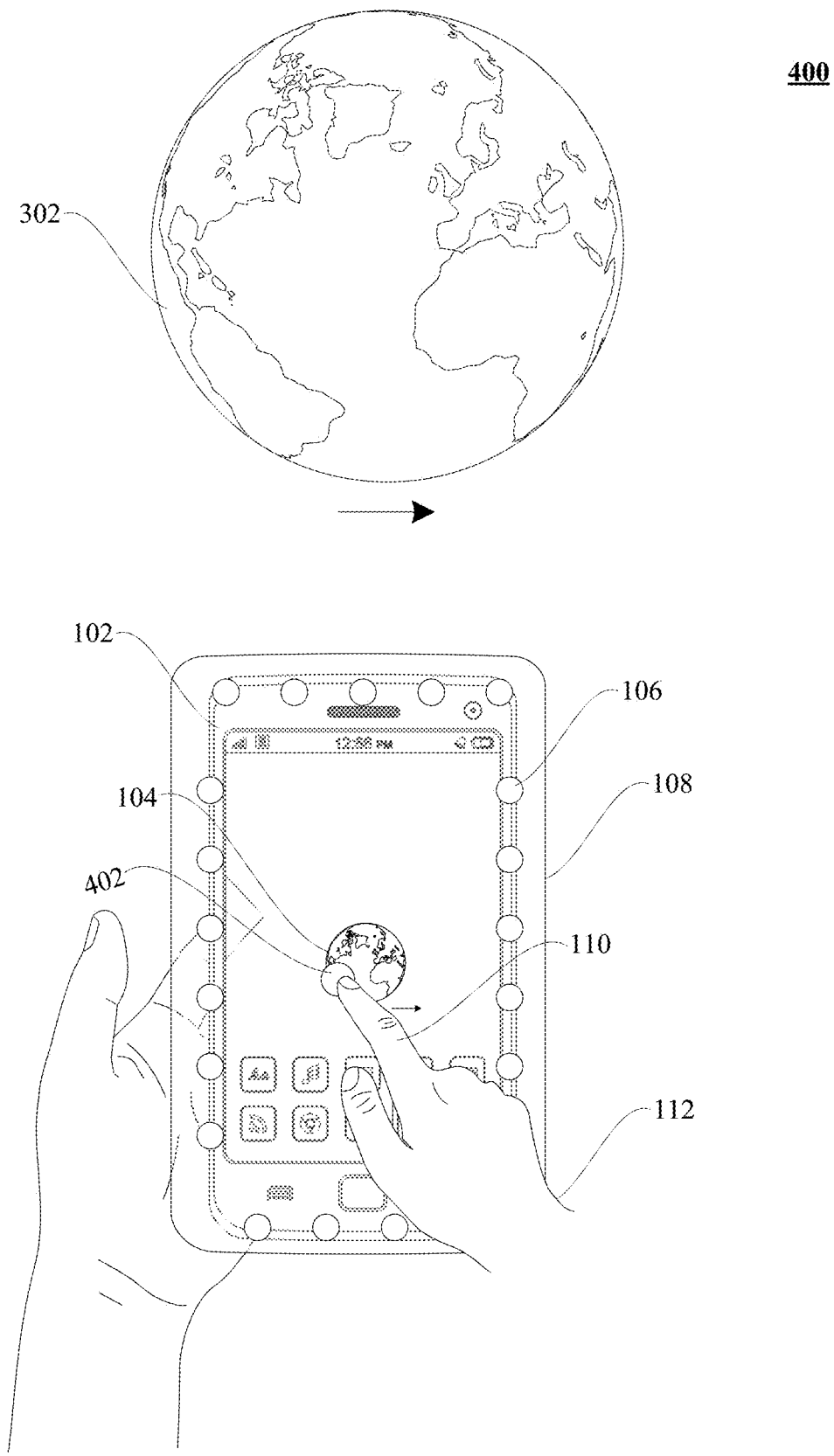
FIG. 4 is one implementation of rightward rotating a virtual object in an augmented reality space and/or a virtual reality space using a virtual control of a smart phone device.

FIG. 4 is one implementation 400 of rightward rotating a virtual object 302 in an augmented reality space and/or a virtual reality space using a virtual control 104 of a smart phone device 102. In FIG. 4. the virtual object 302 is responsive to gestures (e.g. a rightward swipe of the index finger) performed by the control object 112 (e.g. hand) or its portions 110 (e.g. fingers, thumb). In some implementations, the virtual object 302 includes a manipulator 402 that acts as a cursor or pointer for interacting with the virtual object 302.

Figure 5:
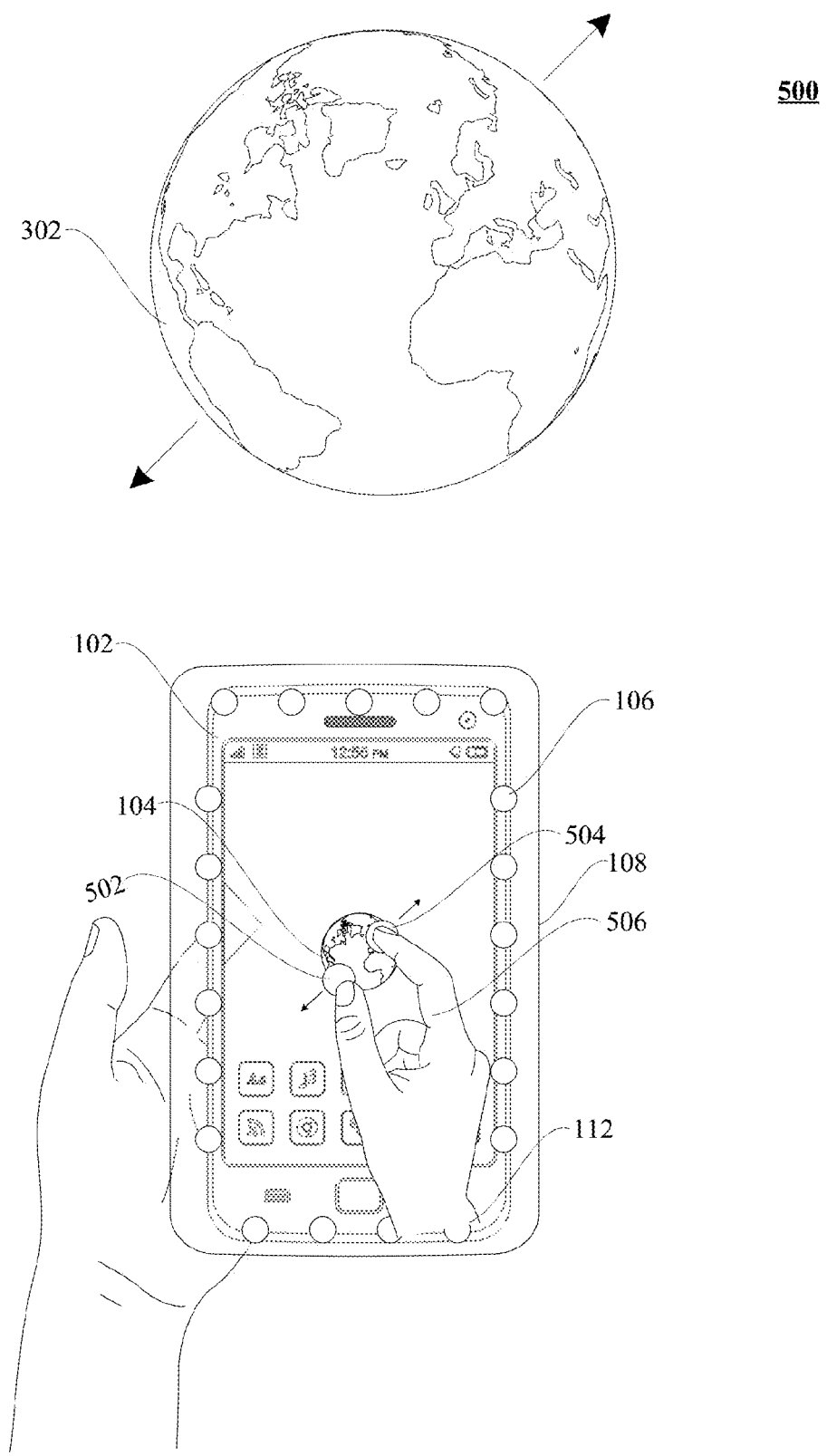
FIG. 5 illustrates one implementation of zooming-out of a virtual object in an augmented reality space and/or a virtual reality space using a virtual control of a smart phone device.

FIG. 5 illustrates one implementation 500 of zooming-out of a virtual object 302 in an augmented reality space and/or a virtual reality space using a virtual control 104 of a smart phone device 102. In FIG. 5. the virtual object 302 is responsive to gestures (e.g. outward expansion of the thumb and the index finger/outward pinch) performed by the control object 112 (e.g. hand) or its portions 110 (e.g. fingers, thumb). In some implementations, the virtual object 302 includes a set of manipulators 502, 504 that act as cursors or pointers for interacting with the virtual object 302.

Figure 6:
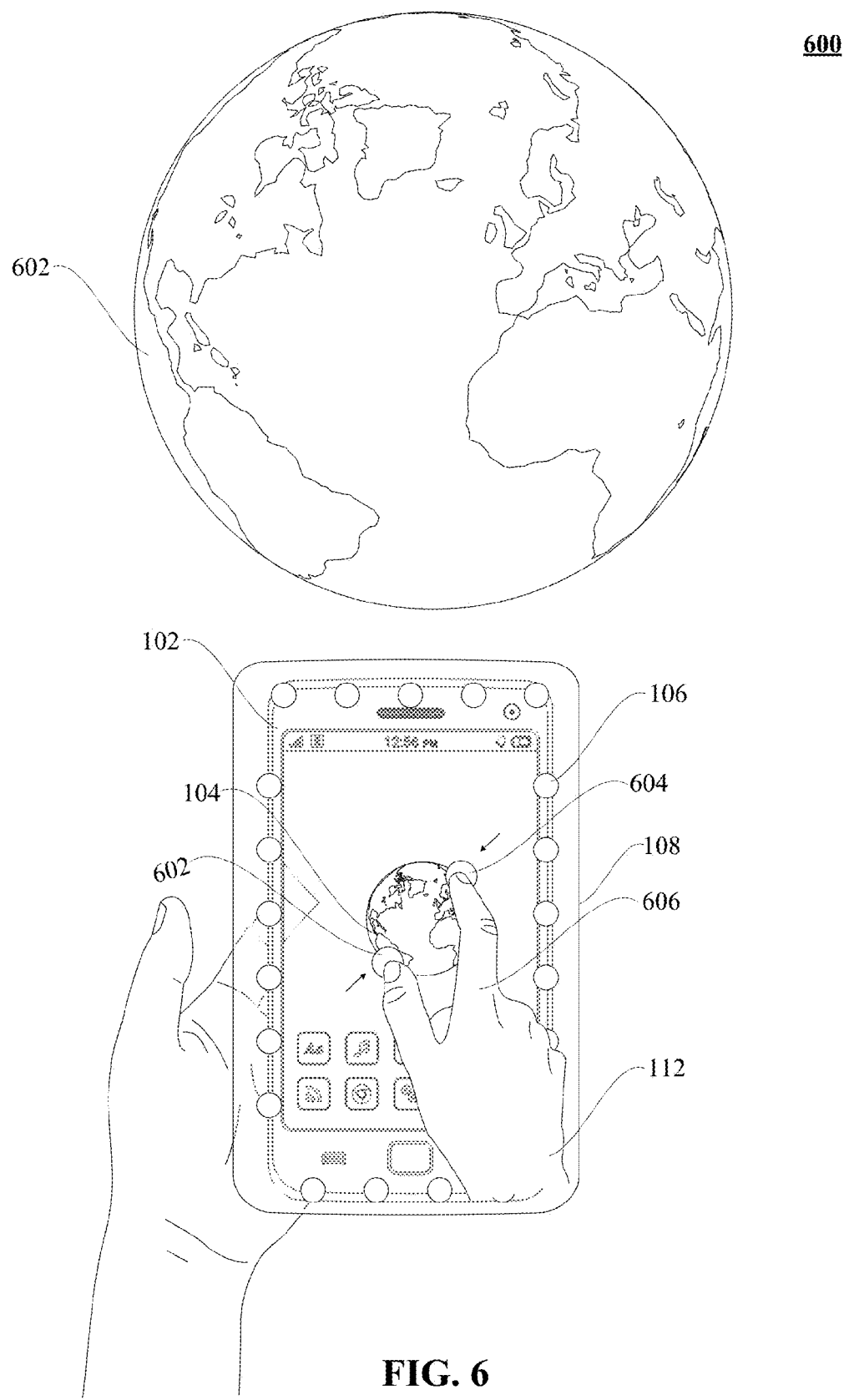
FIG. 6 is one implementation of zooming-in of a virtual object in an augmented reality space and/or a virtual reality space using a virtual control of a smart phone device.

FIG. 6 is one implementation 600 of zooming-in of a virtual object 602 in an augmented reality space and/or a virtual reality space using a virtual control 104 of a smart phone device 102. In FIG. 6. the virtual object 602 is responsive to gestures (e.g. inward expansion of the thumb and the index finger/inward pinch) performed by the control object 112 (e.g. hand) or its portions 606 (e.g. fingers, thumb). In some implementations, the virtual object 602 includes a set of manipulators 602, 604 that act as cursors or pointers for interacting with the virtual object 602.

Figure 7:
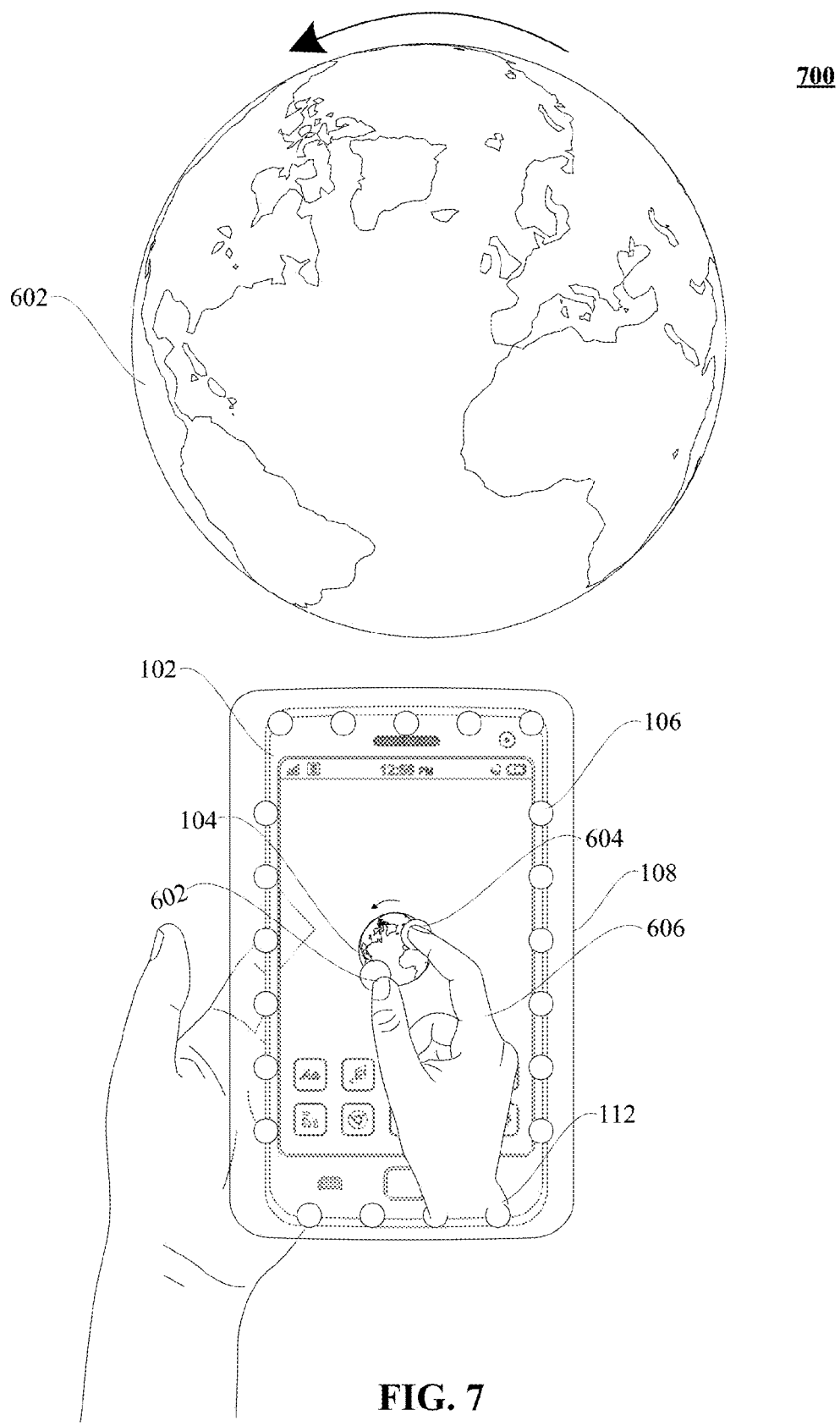
FIG. 7 shows one implementation of leftward rotating a virtual object in an augmented reality space and/or a virtual reality space using a virtual control of a smart phone device.

FIG. 7 shows one implementation of leftward rotating a virtual object 602 in an augmented reality space and/or a virtual reality space using a virtual control 104 of a smart phone device 102. In FIG. 7, the virtual object 602 is responsive to gestures (e.g. combined leftward movement of the thumb and the index finger/leftward pinch) performed by the control object 112 (e.g. hand) or its portions 606 (e.g. fingers, thumb). In some implementations, the virtual object 602 includes a set of manipulators 602, 604 that act as cursors or pointers for interacting with the virtual object 602.

Figure 8:
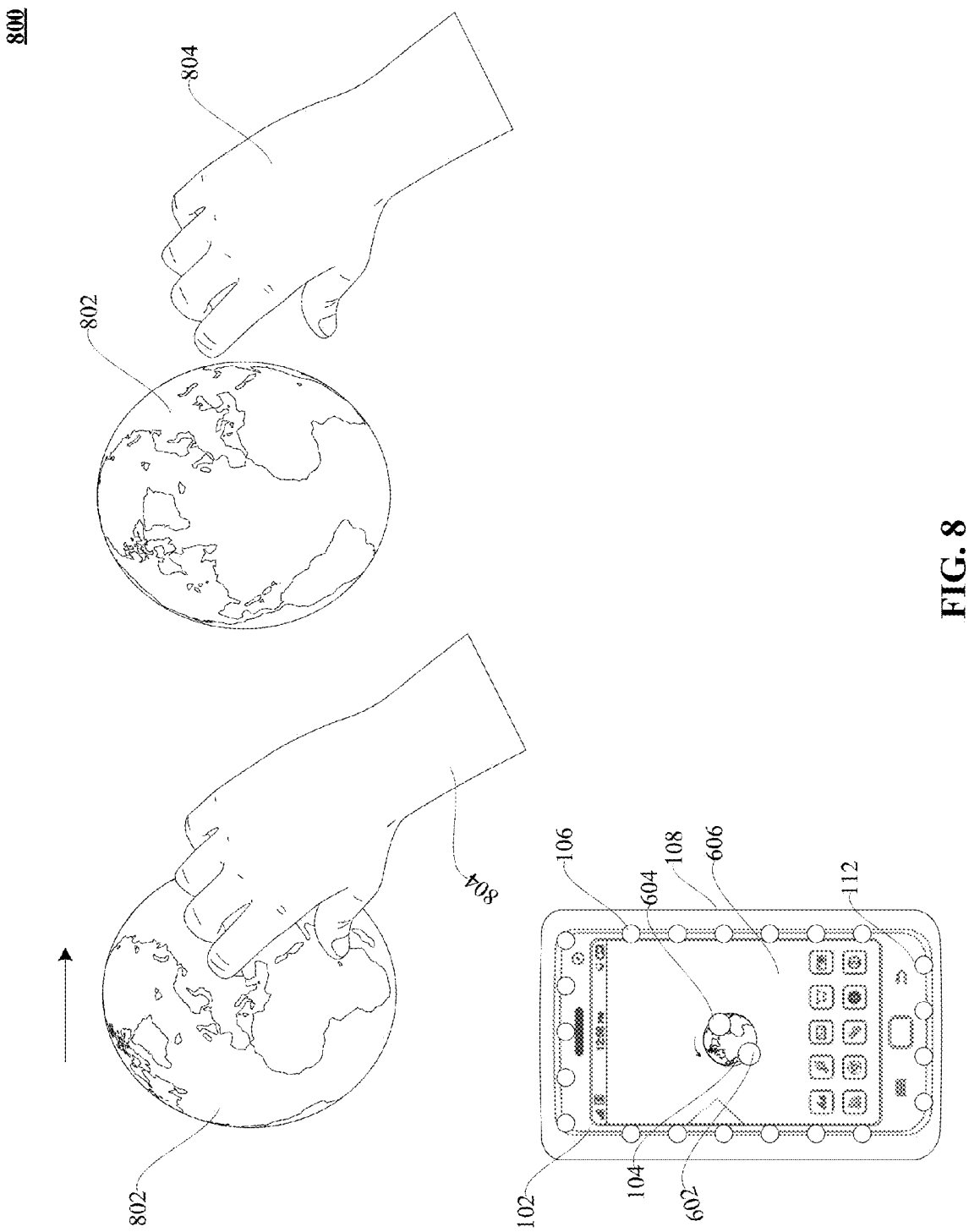
FIG. 8 illustrates one implementation of manipulating a virtual object in an augmented reality space and/or a virtual reality space using free-form gestures sensed away from a virtual control of a smart phone device.

FIG. 8 illustrates one implementation 800 of manipulating a virtual object 802 in an augmented reality space and/or a virtual reality space using free-form gestures (in-air hand curl 804) sensed away from a virtual control 104 of a smart phone device 102. In some implementations, the gestures can be detected using a motion sensory control device in the augmented reality space and/or the virtual reality space. The smart phone device 102 can be connected, e.g., via a USB cable (or any other wired or wireless connection), to a motion-capture device 1224 (such as for example, a dual-camera motion controller as provided by Leap Motion, Inc., San Francisco, Calif. or other interfacing mechanisms and/or combinations thereof) that is positioned and oriented so as to monitor a region where hand motions normally take place. For example, the motion-capture device 1224 can be placed onto a desk or other working surface within the augmented reality space and/or the virtual reality space, and the smart phone device 102 can be held at an angle to that working surface to facilitate easy viewing of the virtual object 802. The smart phone device 102 can be propped up on a tablet stand or against a wall or other suitable vertical surface to free up the second hand, facilitating two-hand gestures.

Figure 9:
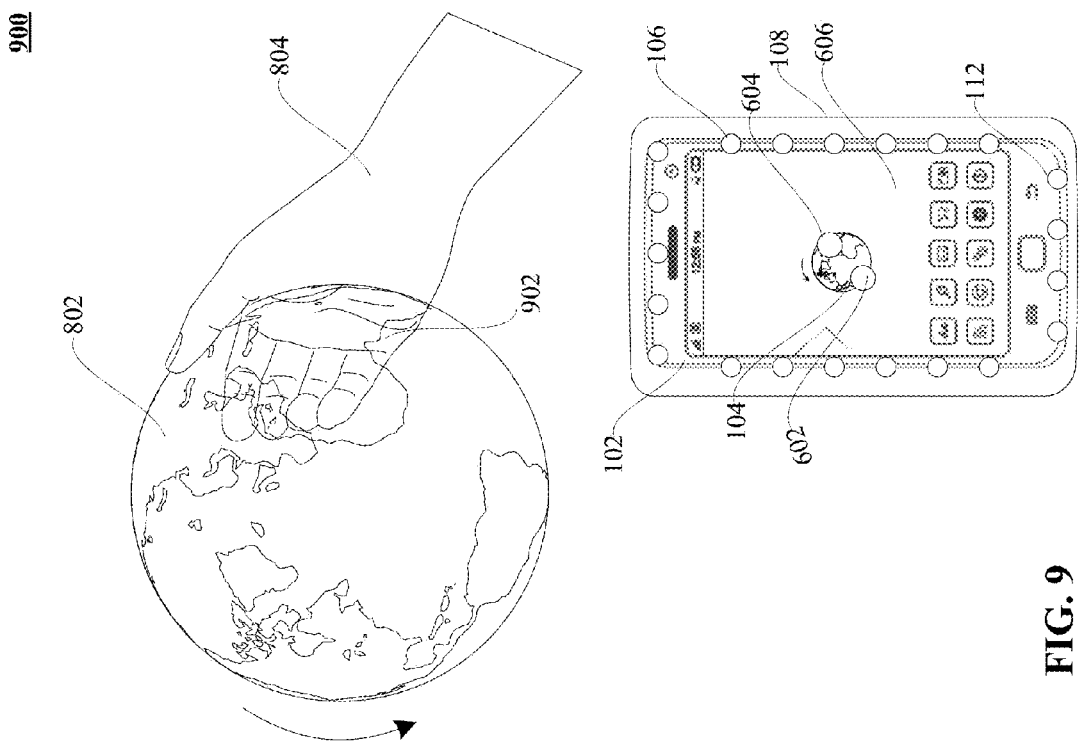
FIG. 9 depicts one implementation of generating data virtually representing a control object or portion thereof that manipulates a virtual object in an augmented reality space and/or a virtual reality space.
Figure 9:
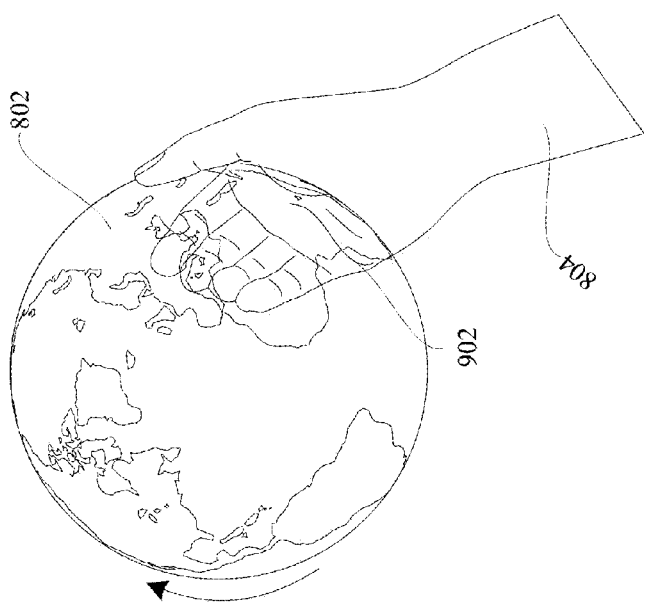

FIG. 9 depicts one implementation 900 of generating data virtually representing a control object 804 or portion thereof 902 that manipulates a virtual object 802 in an augmented reality space and/or a virtual reality space. In FIG. 9, when the control object 804 intersects the virtual object 802, a virtual representation of the portion 902 of the control object 804 is generated and overlaid on the virtual object 802 as computer-generated imagery. In FIG. 9, the gestures used to manipulate the virtual object 802 are upward and downward curl of the hand 804.

Figure 10:
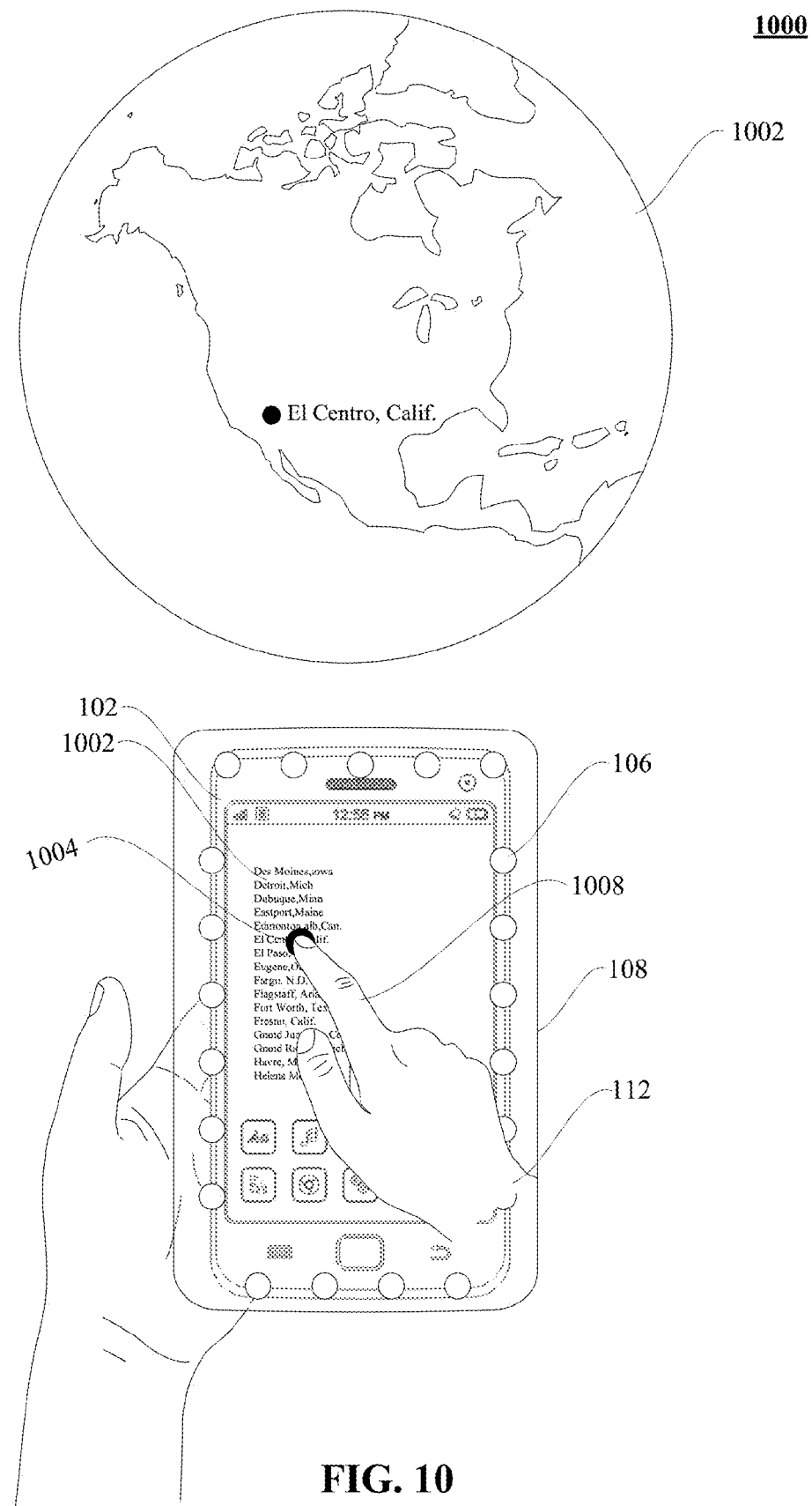
FIG. 10 illustrates one implementation of manipulating a virtual object in an augmented reality space and/or a virtual reality space using traditional input channels provided by a smart phone device.

FIG. 10 illustrates 1000 one implementation of manipulating a virtual object 1002 in an augmented reality space and/or a virtual reality space using traditional input channels provided by a smart phone device 102. Examples of traditional input channels include selecting a screen item from a list displayed on the screen of the smart phone device 102, providing a voice command, providing an optical command, or selecting any other screen object by combinations of the traditional input channels discussed above. In the example shown in FIG. 10, a geographic location on the virtual Earth 1002 is selected and presented to the user in response to selecting the same geographic location as an item 1004 from a list 1002 presented on the smart phone device 102 by a control object portion 1008.

Figure 11:
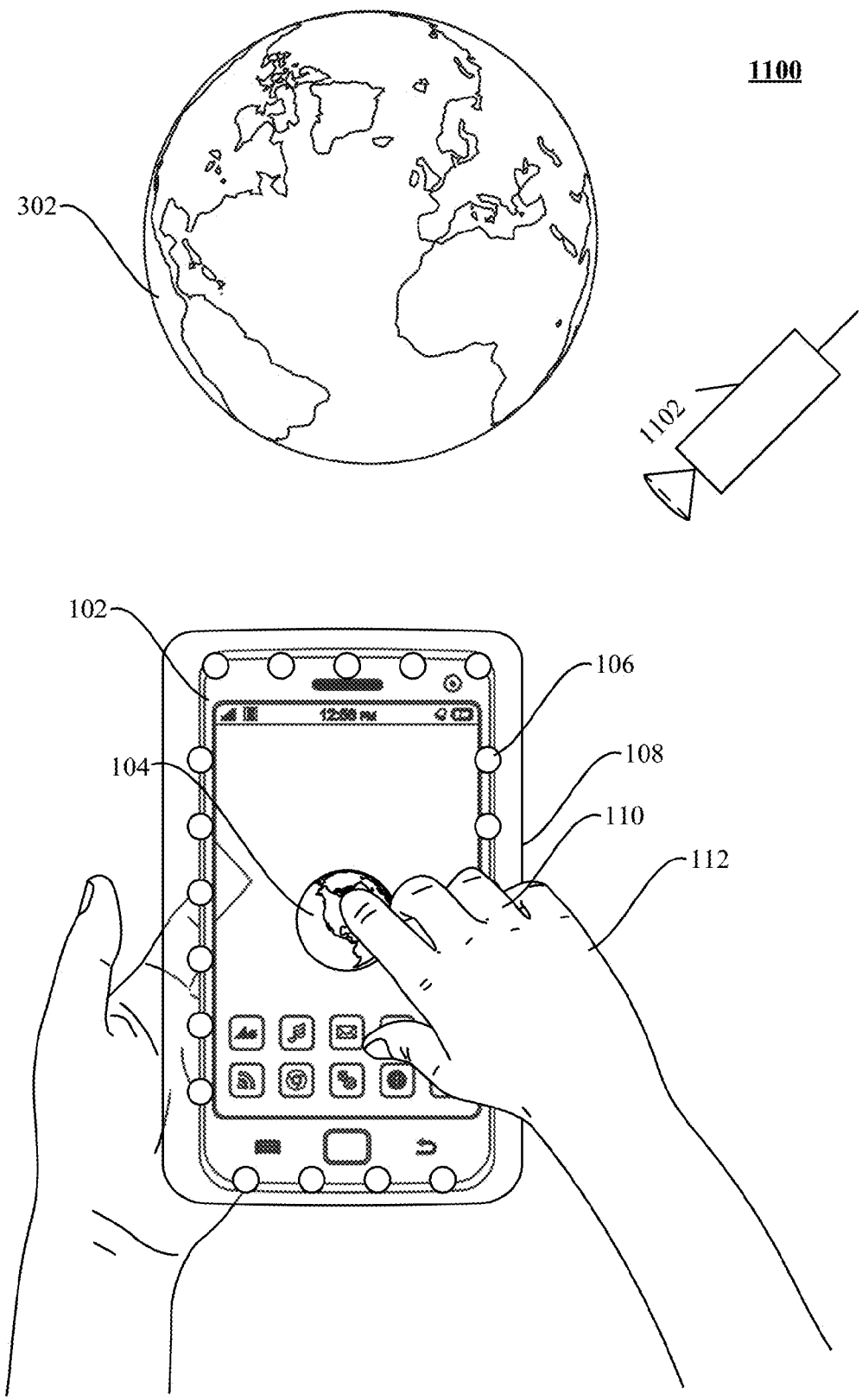
FIG. 11 shows one implementation of identifying a physical location of a smart phone device in at least one image captured by a camera located in an augmented reality space and/or a virtual reality space.

FIG. 11 shows one implementation 1100 of identifying a physical location of a smart phone device 102 in at least one image captured by a camera 1102 located in an augmented reality space and/or a virtual reality space. In FIG. 11, the physical location of the smart phone device 102 is detected by comparing a contour identified by an image of the smart phone device 102 detected by the camera 1102 to a database of image templates. In other implementations, the location of the smart phone device 102 is determined by detecting its contour or the location of the control object or its portion operating on the smart phone device 102 using the techniques described in the "Gesture Recognition System" section described later in this application.

Figure 12:
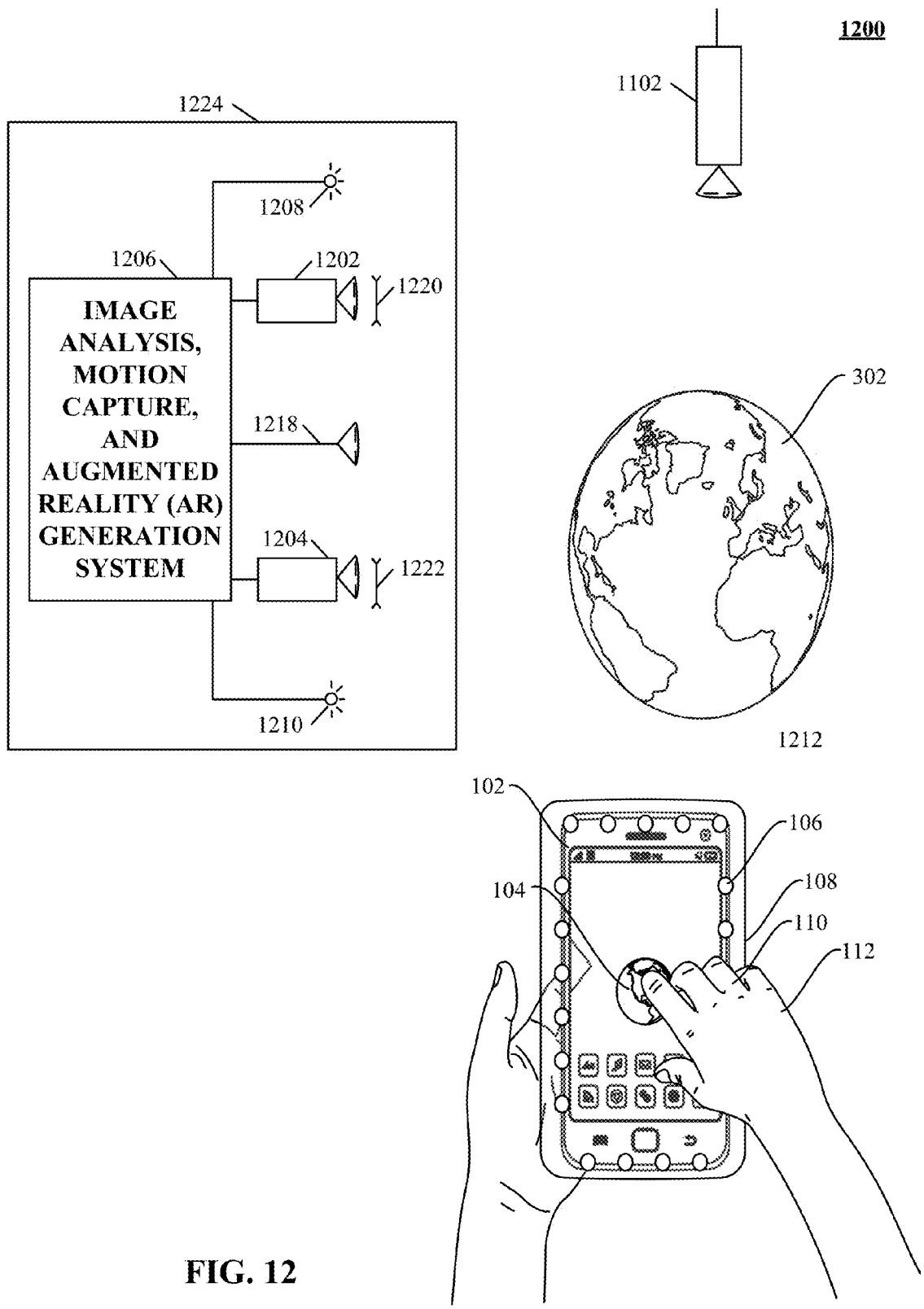
FIG. 12 is one implementation of sensing interactions between a control object and a control coincident with a surface of a smart phone device using at least one phase conjugate component.

FIG. 12 is one implementation of sensing interactions between a control object 112 and a control 104 coincident with a surface of a smart phone device using at least one phase conjugate component. In one implementation, the phase conjugate component includes a series of retro-reflectors 106 attached to the smart phone device 102. The retro-reflectors 106 provide image segmentation by creating a contrast between the portions 110 of the control object 112 that execute the touch gestures on the smart phone device 102 and the rest of the augmented reality space. This way the pixels in the images of the that correspond to the locations of the contact of the touch gestures with the screen of the smart phone device 102 have higher brightness quotient compared to other objects in the an augmented reality space. The retro-reflectors 106 achieve this by reflecting light rays to a camera (1202, 1204, 1102) such that their path is exactly back along their direction of incidence on the retro-reflectors 106.

The retro-reflectors can be, for example, part of a screen made of retro-reflecting material. One example is a corner reflector or a sheet having a plurality of corner reflectors. Another example is a material having plural glass beads or other refracting and/or reflecting devices on or in a support. Another example of a retro-reflector is a film or sheet material having a plurality of corner cubes which material.

Gesture Recognition System

The term "motion capture" refers generally to processes that capture movement of a subject in three dimensional (3D) space and translate that movement into, for example, a digital model or other representation. Motion capture is typically used with complex subjects that have multiple separately articulating members whose spatial relationships change as the subject moves. For instance, if the subject is a walking person, not only does the whole body move across space, but the positions of arms and legs relative to the person's core or trunk are constantly shifting. Motion-capture systems are typically designed to model this articulation.

Motion capture systems can utilize one or more cameras to capture sequential images of an object in motion, and computers to analyze the images to create a reconstruction of an object's shape, position, and orientation as a function of time. For 3D motion capture, at least two cameras are typically used. Image-based motion-capture systems rely on the ability to distinguish an object of interest from a background. This is often achieved using image-analysis algorithms that detect edges, typically by comparing pixels to detect abrupt changes in color and/or brightness. Conventional systems, however, suffer performance degradation under many common circumstances, e.g., low contrast between the object of interest and the background and/or patterns in the background that may falsely register as object edges.

Referring first to FIG. 12, which illustrates an exemplary gesture recognition system 100 including any number of cameras 1202, 1204 coupled to an image and image analysis, motion capture, and augmented reality (AR) generation system 1206 (The system 1206 is hereinafter variably referred to as the "image analysis and motion capture system," the "image analysis system," the "motion capture system," the "control and image-processing system," the "control system," or the "image-processing system," "augmented reality (AR) generation system," depending on which functionality of the system is being discussed.). Cameras 1202, 1204 can be any type of cameras, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. While illustrated using an example of a two camera implementation, other implementations are readily achievable using different numbers of cameras or non-camera light sensitive image sensors or combinations thereof. For example, line sensors or line cameras rather than conventional devices that capture a two-dimensional (2D) image can be employed. Further, the term "light" is used generally to connote any electromagnetic radiation, which may or may not be within the visible spectrum, and may be broadband (e.g., white light) or narrowband (e.g., a single wavelength or narrow band of wavelengths).

Cameras 1202, 1204 are preferably capable of capturing video images (i.e., successive image frames at a constant rate of at least 15 frames per second); although no particular frame rate is required. The capabilities of cameras 1202, 1204 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest can be defined as a cube approximately one meter on a side.

In some implementations, the illustrated system 1200 includes one or more sources 108, 110, which can be disposed to either side of cameras 1202, 1204, and are controlled by image analysis and motion capture system 1206. In one implementation, the sources 1208, 1210 are light sources. For example, the light sources can be infrared light sources, e.g., infrared light emitting diodes (LEDs), and cameras 1202, 1204 can be sensitive to infrared light. Use of infrared light can allow the gesture recognition system 1200 to operate under a broad range of lighting conditions and can avoid various inconveniences or distractions that may be associated with directing visible light into the region where the person is moving. However, a particular wavelength or region of the electromagnetic spectrum can be required. In one implementation, filters 1220, 1222 are placed in front of cameras 1202, 1204 to filter out visible light so that only infrared light is registered in the images captured by cameras 1202, 1204. In another implementation, the sources 1208, 1210 are sonic sources providing sonic energy appropriate to one or more sonic sensors (not shown in FIG. 12 for clarity sake) used in conjunction with, or instead of, cameras 1202, 1204. The sonic sources transmit sound waves to the user; with the user either blocking ("sonic shadowing") or altering the sound waves ("sonic deflections") that impinge upon her. Such sonic shadows and/or deflections can also be used to detect the user's gestures and/or provide presence information and/or distance information using ranging techniques. In some implementations, the sound waves are, for example, ultrasound, that are not audible to humans.

It should be stressed that the arrangement shown in FIG. 12 is representative and not limiting. For example, lasers or other light sources can be used instead of LEDs. In implementations that include laser(s), additional optics (e.g., a lens or diffuser) can be employed to widen the laser beam (and make its field of view similar to that of the cameras). Useful arrangements can also include short-angle and wide-angle illuminators for different ranges. Light sources are typically diffuse rather than specular point sources; for example, packaged LEDs with light-spreading encapsulation are suitable.

In operation, light sources 1208, 1210 are arranged to illuminate a region of interest 1212 that includes an entire control object 112 or its portion 110 (in this example, a hand) that may optionally hold a tool or other object of interest. Cameras 1202, 1204 are oriented toward the region to capture video images of the hand 112. In some implementations, the operation of light sources 1208, 1210 and cameras 1202, 1204 is controlled by the image analysis and motion capture system 1206, which can be, e.g., a computer system, control logic implemented in hardware and/or software or combinations thereof. Based on the captured images, image analysis and motion capture system 1206 determines the position and/or motion of hand 112

Gesture recognition can be improved by enhancing contrast between the virtual object of interest 302 and background surfaces like surface visible in an image, for example, by means of controlled lighting directed at the object. For instance, in motion capture system 1206 where a virtual object of interest 302, such as a person's hand, is significantly closer to the cameras 1202 and 1204 than the background surface, the falloff of light intensity with distance ($1/r2$ for point like light sources) can be exploited by positioning a light source (or multiple light sources) near the camera(s) or other image-capture device(s) and shining that light onto the virtual object 302. Source light reflected by the nearby virtual object of interest 302 can be expected to be much brighter than light reflected from more distant background surface, and the more distant the background (relative to the object), the more pronounced the effect will be. Accordingly, a threshold cut off on pixel brightness in the captured images can be used to distinguish "object" pixels from "background" pixels. While broadband ambient light sources can be employed, various implementations use light having a confined wavelength range and a camera matched to detect such light; for example, an infrared source light can be used with one or more cameras sensitive to infrared frequencies.

In operation, cameras 1202, 1204 are oriented toward a region of interest 1212 in which a virtual object of interest 302 and control object 112 (in this example, a hand) and one or more background objects can be present. Light sources 1208, 1210 are arranged to illuminate region 1212. In some implementations, one or more of the light sources 1208, 1210 and one or more of the cameras 1202, 1204 are disposed below the motion to be detected, e.g., in the case of hand motion, on a table or other surface beneath the spatial region where hand motion occurs. This is an optimal location because the amount of information recorded about the hand is proportional to the number of pixels it occupies in the camera images, and the hand will occupy more pixels when the camera's angle with respect to the hand's "pointing direction" is as close to perpendicular as possible. Further, if the cameras 1202, 1204 are looking up, there is little likelihood of confusion with background objects (clutter on the user's desk, for example) and other people within the cameras' field of view.

Control and image-processing system 1206, which can be, e.g., a computer system, can control the operation of light sources 1208, 1210 and cameras 1202, 1204 to capture images of region. Based on the captured images, the image-processing system 106 determines the position and/or motion of object 1214. For example, as a step in determining the position of object 302, image-analysis system 1206 can determine which pixels of various images captured by cameras 1202, 1204 contain portions of object 302. In some implementations, any pixel in an image can be classified as an "object" pixel or a "background" pixel depending on whether that pixel contains a portion of object 302 or not. With the use of light sources 1208, 1210, classification of pixels as object or background pixels can be based on the brightness of the pixel. For example, the distance (rO) between a virtual object of interest 302 and cameras 1202, 1204 is expected to be smaller than the distance (rB) between background object(s) and cameras 1202, 1204. Because the intensity of light from sources 1208, 1210 decreases as $1/r2$, object 302 will be more brightly lit than background, and pixels containing portions of object 302 (i.e., object pixels) will be correspondingly brighter than pixels containing portions of background (i.e., background pixels). For example, if rB/rO=2, then object pixels will be approximately four times brighter than background pixels, assuming virtual object 302 and background are similarly reflective of the light from sources 1208, 1210, and further assuming that the overall illumination of region (at least within the frequency band captured by cameras 1202, 1204) is dominated by light sources 1208, 1210. These assumptions generally hold for suitable choices of cameras 1202, 1204, light sources 1208, 1210, filters 1220, 1222, and objects commonly encountered. For example, light sources 1208, 1210 can be infrared LEDs capable of strongly emitting radiation in a narrow frequency band, and filters 1220, 1222 can be matched to the frequency band of light sources 1208, 1210. Thus, although a human hand or body, or a heat source or other object in the background, may emit some infrared radiation, the response of cameras 1202, 1204 can still be dominated by light originating from sources 1208, 1210 and reflected by object 302 and/or background.

In this arrangement, image-analysis system 1206 can quickly and accurately distinguish object pixels from background pixels by applying a brightness threshold to each pixel. For example, pixel brightness in a CMOS sensor or similar device can be measured on a scale from 0.0 (dark) to 1.0 (fully saturated), with some number of gradations in between depending on the sensor design. The brightness encoded by the camera pixels scales standardly (linearly) with the luminance of the object, typically due to the deposited charge or diode voltages. In some implementations, light sources 1208, 1210 are bright enough that reflected light from an object at distance rO produces a brightness level of 1.0 while an object at distance rB=2rO produces a brightness level of 0.25. Object pixels can thus be readily distinguished from background pixels based on brightness. Further, edges of the object can also be readily detected based on differences in brightness between adjacent pixels, allowing the position of the object within each image to be determined. Correlating object positions between images from cameras 1202, 1204 allows image-analysis system 1206 to determine the location in 3D space of a virtual object 302, and analyzing sequences of images allows image-analysis system 1206 to reconstruct 3D motion of virtual object 302 using conventional motion algorithms.

In accordance with various implementations of the technology disclosed, the cameras 1202, 1204 (and typically also the associated image-analysis functionality of control and image-processing system 1206) are operated in a low-power mode until a virtual object of interest 302 is detected in the region of interest 1212. For purposes of detecting the appearance of a virtual object of interest 302 into this region, the system 1200 further includes one or more light sensors 1218 that monitor the brightness in the region of interest 1212 and detect any change in brightness. For example, a single light sensor including, e.g., a photodiode that provides an output voltage indicative of (and over a large range proportional to) a measured light intensity may be disposed between the two cameras 1202, 1204 and oriented toward the region of interest 1212. The one or more sensors 1218 continuously measure one or more environmental illumination parameters such as the brightness of light received from the environment. Under static conditions—which implies the absence of any motion in the region of interest 1212—the brightness will be constant. If an object enters the region of interest 1212, however, the brightness may abruptly change. For example, a person walking in front of the sensor(s) 1218 may block light coming from an opposing end of the room, resulting in a sudden decrease in brightness. In other situations, the person may reflect light from a light source in the room onto the sensor, resulting in a sudden increase in measured brightness.

The aperture of the sensor(s) 1218 may be sized such that its (or their collective) field of view overlaps with that of the cameras 1202, 1204. In some implementations, the field of view of the sensor(s) 1218 is substantially co-existent with that of the cameras 1202, 1204 such that substantially all objects entering the camera field of view are detected. In other implementations, the sensor field of view encompasses and exceeds that of the cameras. This enables the sensor(s) 1218 to provide an early warning if an object of interest approaches the camera field of view. In yet other implementations, the sensor(s) capture(s) light from only a portion of the camera field of view, such as a smaller area of interest located in the center of the camera field of view.

The control and image-processing system 1206 monitors the output of the sensor(s) 118, and if the measured brightness changes by a set amount (e.g., by 10% or a certain number of candela), it recognizes the presence of an object of interest in the region of interest 1212. The threshold change may be set based on the geometric configuration of the region of interest and the motion-capture system, the general lighting conditions in the area, the sensor noise level, and the expected size, proximity, and reflectivity of the object of interest so as to minimize both false positives and false negatives. In some implementations, suitable settings are determined empirically, e.g., by having a person repeatedly walk into and out of the region of interest 1212 and tracking the sensor output to establish a minimum change in brightness associated with the person's entrance into and exit from the region of interest 1212. Of course, theoretical and empirical threshold-setting methods may also be used in conjunction. For example, a range of thresholds may be determined based on theoretical considerations (e.g., by physical modelling, which may include ray tracing, noise estimation, etc.), and the threshold thereafter fine-tuned within that range based on experimental observations.

In implementations where the area of interest 1212 is illuminated, the sensor(s) 1218 will generally, in the absence of an object in this area, only measure scattered light amounting to a small fraction of the illumination light. Once an object enters the illuminated area, however, this object may reflect substantial portions of the light toward the sensor(s) 1218, causing an increase in the measured brightness. In some implementations, the sensor(s) 1218 is (or are) used in conjunction with the light sources 1206, 1208 to deliberately measure changes in one or more environmental illumination parameters such as the reflectivity of the environment within the wavelength range of the light sources. The light sources may blink, and a brightness differential be measured between dark and light periods of the blinking cycle. If no object is present in the illuminated region, this yields a baseline reflectivity of the environment. Once an object is in the area of interest 1212, the brightness differential will increase substantially, indicating increased reflectivity. (Typically, the signal measured during dark periods of the blinking cycle, if any, will be largely unaffected, whereas the reflection signal measured during the light period will experience a significant boost.) Accordingly, the control system 1206 monitoring the output of the sensor(s) 1218 may detect an object in the region of interest 1212 based on a change in one or more environmental illumination parameters such as environmental reflectivity that exceeds a predetermined threshold (e.g., by 10% or some other relative or absolute amount). As with changes in brightness, the threshold change may be set theoretically based on the configuration of the image-capture system and the monitored space as well as the expected objects of interest, and/or experimentally based on observed changes in reflectivity.

Figure 13:
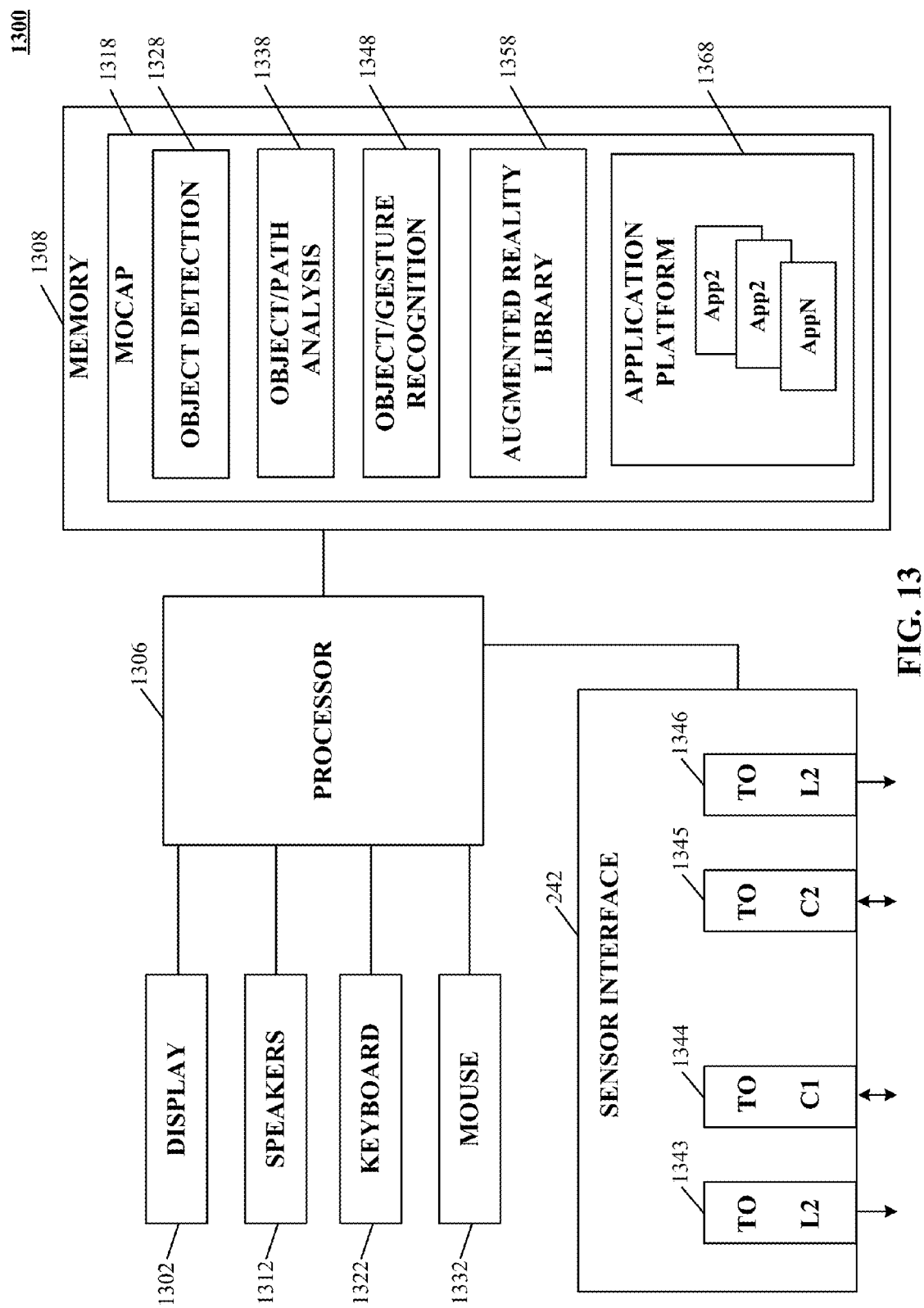
FIG. 13 is a simplified block diagram of a computer system implementing a gesture-recognition apparatus according to an implementation of the technology disclosed.

FIG. 13 is a simplified block diagram 1300 of a computer system 1310, implementing image analysis and motion capture system 1206 according to an implementation of the technology disclosed. Image analysis and motion capture system 1206 can include or consist of any device or device component that is capable of capturing and processing image data. In some implementations, computer system 1300 includes a processor 1306, memory 1308, a sensor interface 1342, a display 1302 (or other presentation mechanism(s), e.g. holographic projection systems, wearable goggles or other head mounted displays (HMDs), heads up displays (HUDs), other visual presentation mechanisms or combinations thereof, speakers 1312, a keyboard 1322, and a mouse 1332. Memory 1308 can be used to store instructions to be executed by processor 1306 as well as input and/or output data associated with execution of the instructions. In particular, memory 1308 contains instructions, conceptually illustrated as a group of modules described in greater detail below, that control the operation of processor 1306 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MAC OS operating system, the APACHE operating system, an OPENACTION operating system, iOS, Android or other mobile operating systems, or another operating system platform.

The computing environment can also include other removable/non-removable, volatile/nonvolatile computer storage media. For example, a hard disk drive can read or write to non-removable, nonvolatile magnetic media. A magnetic disk drive can read from or write to a removable, nonvolatile magnetic disk, and an optical disk drive can read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid physical arrangement RAM, solid physical arrangement ROM, and the like. The storage media are typically connected to the system bus through a removable or non-removable memory interface.

Processor 1306 can be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Sensor interface 1342 can include hardware and/or software that enables communication between computer system 1300 and cameras such as cameras 1202, 1204 shown in FIG. 12, as well as associated light sources such as light sources 1208, 1210 of FIG. 12. Thus, for example, sensor interface 1342 can include one or more data ports 1318, 1345 to which cameras can be connected, as well as hardware and/or software signal processors to modify data signals received from the cameras (e.g., to reduce noise or reformat data) prior to providing the signals as inputs to a motion-capture ("mocap") program 1318 executing on processor 1306. In some implementations, sensor interface 1342 can also transmit signals to the cameras, e.g., to activate or deactivate the cameras, to control camera settings (frame rate, image quality, sensitivity, etc.), or the like. Such signals can be transmitted, e.g., in response to control signals from processor 1306, which can in turn be generated in response to user input or other detected events.

Sensor interface 1342 can also include controllers 1343, 1346, to which light sources (e.g., light sources 1208, 1210) can be connected. In some implementations, controllers 1343, 1346 provide operating current to the light sources, e.g., in response to instructions from processor 1306 executing mocap program 1318. In other implementations, the light sources can draw operating current from an external power supply, and controllers 1343, 1346 can generate control signals for the light sources, e.g., instructing the light sources to be turned on or off or changing the brightness. In some implementations, a single controller can be used to control multiple light sources.

Instructions defining mocap program 1318 are stored in memory 1308, and these instructions, when executed, perform motion-capture analysis on images supplied from cameras connected to sensor interface 1342. In one implementation, mocap program 1318 includes various modules, such as an object detection module 1328, an object analysis module 1338, and a gesture-recognition module 1348. Object detection module 1328 can analyze images (e.g., images captured via sensor interface 1342) to detect edges of an object therein and/or other information about the object's location. Object analysis module 1338 can analyze the object information provided by object detection module 1328 to determine the 3D position and/or motion of the object (e.g., a user's hand). Examples of operations that can be implemented in code modules of mocap program 1318 are described below. Memory 1308 can also include other information and/or code modules used by mocap program 1318 such as augmented reality (AR) library 1358 that serves as an image repository of virtual objects and an application platform 1368, which allows a user to interact with the mocap program 1318 using different applications like application 1 (App1), application 2 (App2), and application N (AppN).

Display 1302, speakers 1312, keyboard 1322, and mouse 1332 can be used to facilitate user interaction with computer system 1300. In some implementations, results of gesture capture using sensor interface 1342 and mocap program 1318 can be interpreted as user input. For example, a user can perform hand gestures that are analyzed using mocap program 1318, and the results of this analysis can be interpreted as an instruction to some other program executing on processor 1306 (e.g., a web browser, word processor, or other application). Thus, by way of illustration, a user might use upward or downward swiping gestures to "scroll" a webpage currently displayed on display 1302, to use rotating gestures to increase or decrease the volume of audio output from speakers 1312, and so on.

It will be appreciated that computer system 1300 is illustrative and that variations and modifications are possible. Computer systems can be implemented in a variety of form factors, including server systems, desktop systems, laptop systems, tablets, smart phones or personal digital assistants, wearable devices, e.g., goggles, head mounted displays (HMDs), wrist computers, and so on. A particular implementation can include other functionality not described herein, e.g., wired and/or wireless network interfaces, media playing and/or recording capability, etc. In some implementations, one or more cameras can be built into the computer or other device into which the sensor is imbedded rather than being supplied as separate components. Further, an image analyzer can be implemented using only a subset of computer system components (e.g., as a processor executing program code, an ASIC, or a fixed-function digital signal processor, with suitable I/O interfaces to receive image data and output analysis results).

While computer system 1300 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

With reference to FIGS. 12 and 13, the user performs a gesture that is captured by the cameras 1202, 1204 as a series of temporally sequential images. In other implementations, cameras 1202, 1204 can capture any observable pose or portion of a user. For instance, if a user walks into the field of view near the cameras 1202, 1204, cameras 1202, 1204 can capture not only the whole body of the user, but the positions of arms and legs relative to the person's core or trunk. These are analyzed by a gesture-recognition module 1348, which can be implemented as another module of the mocap 1318. Gesture-recognition module 1348 provides input to an electronic device, allowing a user to remotely control the electronic device and/or manipulate virtual objects, such as prototypes/models, blocks, spheres, or other shapes, buttons, levers, or other controls, in a virtual environment displayed on display 1302. The user can perform the gesture using any part of her body, such as a finger, a hand, or an arm. As part of gesture recognition or independently, the image analysis and motion capture system 1206 can determine the shapes and positions of the user's hand in 3D space and in real time; see, e.g., U.S. Ser. Nos. 61/587, 554, 13/414,485, 61/724,091, and 13/724,357 filed on Jan. 17, 2012, Mar. 7, 2012, Nov. 8, 2012, and Dec. 21, 2012 respectively, the entire disclosures of which are hereby incorporated by reference. As a result, the image analysis and motion capture system processor 1306 can not only recognize gestures for purposes of providing input to the electronic device, but can also capture the position and shape of the user's hand in consecutive video images in order to characterize the hand gesture in 3D space and reproduce it on the display screen 1302.

In one implementation, the gesture-recognition module 1348 compares the detected gesture to a library of gestures electronically stored as records in a database, which is implemented in the image analysis and motion capture system 1206, the electronic device, or on an external storage system. (As used herein, the term "electronically stored" includes storage in volatile or non-volatile storage, the latter including disks, Flash memory, etc., and extends to any computationally addressable storage media (including, for example, optical storage).) For example, gestures can be stored as vectors, i.e., mathematically specified spatial trajectories, and the gesture record can have a field specifying the relevant part of the user's body making the gesture; thus, similar trajectories executed by a user's hand and head can be stored in the database as different gestures so that an application can interpret them differently.

Figure 14:
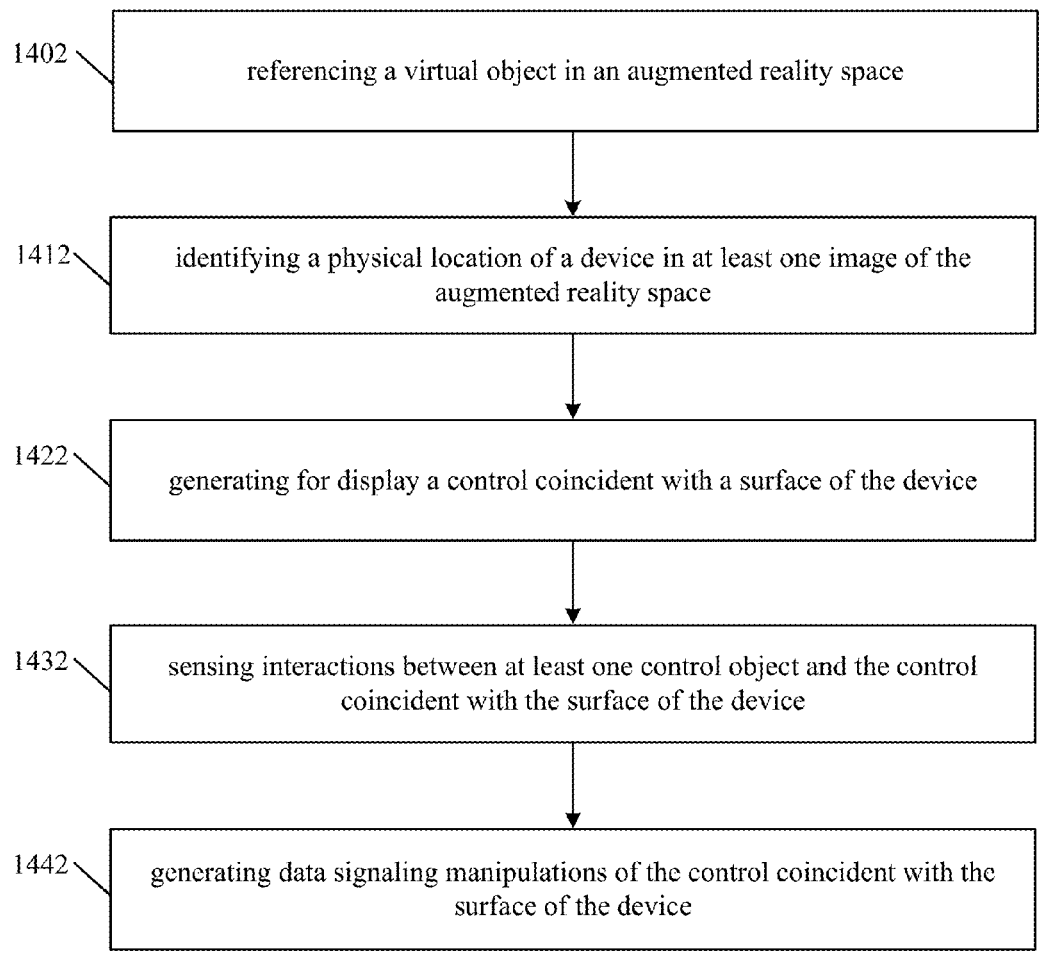
FIG. 14 illustrates one implementation of a method of interacting with a virtual object in an augmented reality space using a virtual control of a smart phone device.

FIG. 14 illustrates one implementation of a method 1400 of interacting with a virtual object in an augmented reality space using a virtual control of a smart phone device. Flowchart shown in FIG. 14 can be implemented at least partially with by one or more processors configured to receive or retrieve information, process the information, store results, and transmit the results. Other implementations may perform the actions in different orders and/or with different, varying, alternative, modified, fewer or additional actions than those illustrated in FIG. 14. Multiple actions can be combined in some implementations. For convenience, this flowchart is described with reference to the system that carries out a method. The system is not necessarily part of the method.

At action 1402, a virtual object is referenced in an augmented reality space. In one implementation, the virtual object is referenced in response to submitting manipulations of a virtual control as messages via UDP/IP to an AR application responsive to the virtual control. The AR application facilitates the rendering of 3D models, provides functions for collision detection and supports interaction between the virtual objects and the virtual control. In other implementations, the AR application selects the 3D models, translates, rotates, scales, changes attributes of the virtual objects.

At action 1412, a physical location of a device is identified in in at least one image of the augmented reality space using one or more cameras, as described above.

At action 1422, a control coincident with a surface of the device is generated, as described above.

At action 1432, interactions between at least one control object and the control coincident with the surface of the device are sensed, as described above.

At action 1442, data signaling manipulations of the control coincident with the surface of the device are generated, as described above.

The method described in this implementation and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as virtual control and gesture recognition system.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations of the method described in this implementation can include a non-transitory computer readable storage medium storing instructions executable by a processor to perform any of the methods described above. Yet another implementation of the method described in this implementation can include a system including memory and one or more processors operable to execute instructions, stored in the memory, to perform any of the methods described above.

Figure 15:
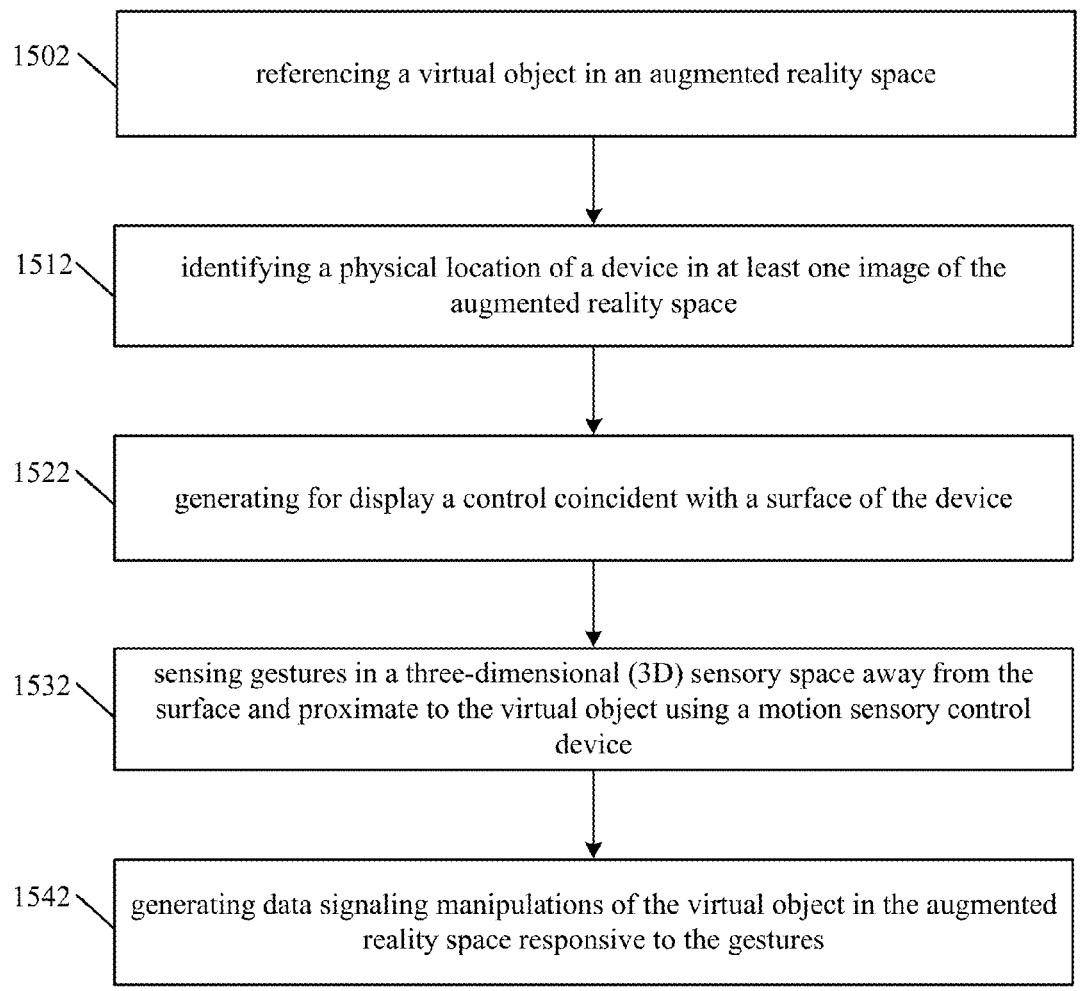
FIG. 15 is a flowchart showing a method of interacting with a virtual object in an augmented reality space using gestures sensed away from a virtual control of a smart phone device.

FIG. 15 is a flowchart 1500 showing a method of interacting with a virtual object in an augmented reality space using gestures sensed away from a virtual control of a smart phone device. Flowchart shown in FIG. 15 can be implemented at least partially with by one or more processors configured to receive or retrieve information, process the information, store results, and transmit the results. Other implementations may perform the actions in different orders and/or with different, varying, alternative, modified, fewer or additional actions than those illustrated in FIG. 15. Multiple actions can be combined in some implementations. For convenience, this flowchart is described with reference to the system that carries out a method. The system is not necessarily part of the method.

At action 1502, a virtual object is referenced in an augmented reality space. In one implementation, the virtual object is referenced in response to submitting manipulations of a virtual control as messages via UDP/IP to an AR application responsive to the virtual control. The AR application facilitates the rendering of 3D models, provides functions for collision detection and supports interaction between the virtual objects and the virtual control. In other implementations, the AR application selects the 3D models, translates, rotates, scales, changes attributes of the virtual objects.

At action 1512, a physical location of a device is identified in in at least one image of the augmented reality space using one or more cameras, as described above.

At action 1522, a control coincident with a surface of the device is generated, as described above.

At action 1532, gestures in a three-dimensional (3D) sensory space away from the surface and proximate to the virtual object using a motion sensory control device are sensed, as described above.

At action 1542, data signaling manipulations of the virtual object in the augmented reality space responsive to the gestures are generated, as described above.

The method described in this implementation and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as virtual control and gesture recognition system.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations of the method described in this implementation can include a non-transitory computer readable storage medium storing instructions executable by a processor to perform any of the methods described above. Yet another implementation of the method described in this implementation can include a system including memory and one or more processors operable to execute instructions, stored in the memory, to perform any of the methods described above.

Figure 16:
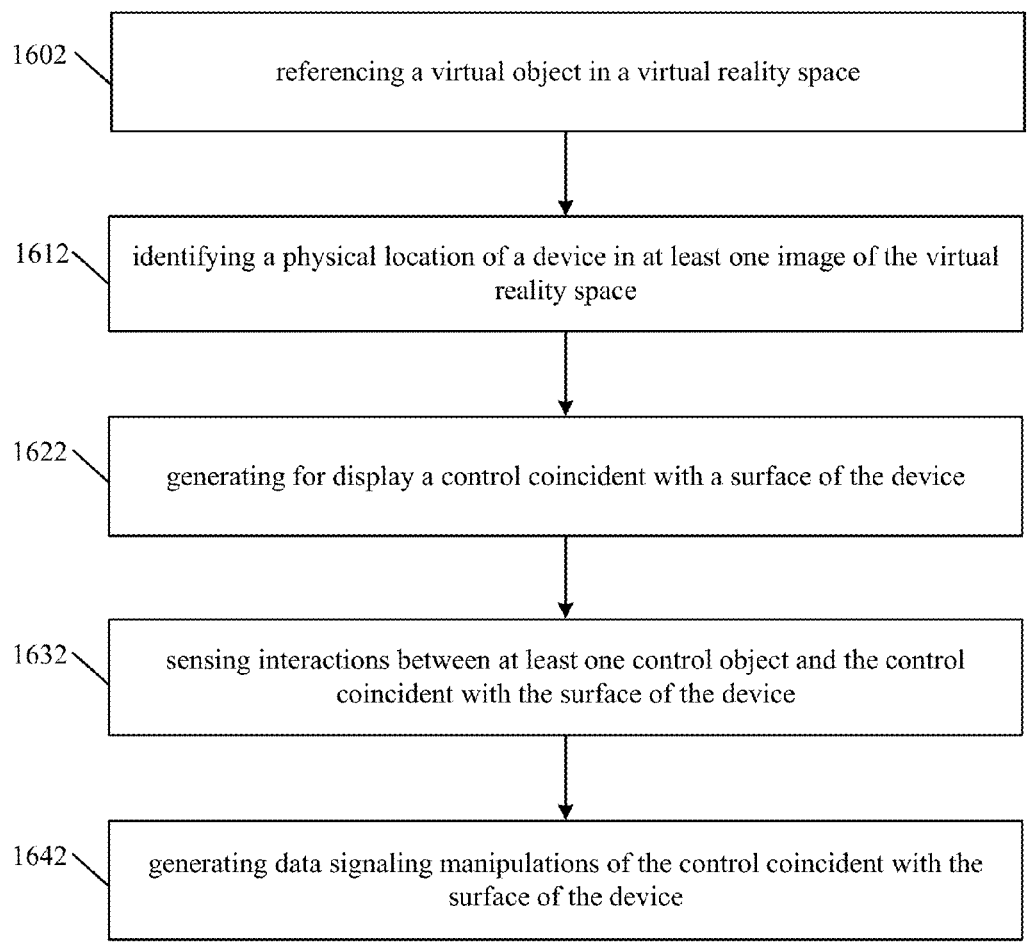
FIG. 16 shows a representative method of navigating a method of interacting with a virtual object in a virtual reality space.

FIG. 16 shows a representative method 1600 of navigating a method of interacting with a virtual object in a virtual reality space. Flowchart shown in FIG. 16 can be implemented at least partially with by one or more processors configured to receive or retrieve information, process the information, store results, and transmit the results. Other implementations may perform the actions in different orders and/or with different, varying, alternative, modified, fewer or additional actions than those illustrated in FIG. 16. Multiple actions can be combined in some implementations. For convenience, this flowchart is described with reference to the system that carries out a method. The system is not necessarily part of the method.

At action 1602, a virtual object is referenced in a virtual reality space. In one implementation, the virtual object is referenced in response to submitting manipulations of a virtual control as messages via UDP/IP to a VR application responsive to the virtual control. The VR application facilitates the rendering of 3D models, provides functions for collision detection and supports interaction between the virtual objects and the virtual control. In other implementations, the AR application selects the 3D models, translates, rotates, scales, changes attributes of the virtual objects.

At action 1612, a physical location of a device is identified in in at least one image of the virtual reality space using one or more cameras, as described above.

At action 1622, a control coincident with a surface of the device is generated, as described above.

At action 1632, interactions between at least one control object and the control coincident with the surface of the device are sensed, as described above.

At action 1642, data signaling manipulations of the control coincident with the surface of the device are generated, as described above.

The method described in this implementation and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as virtual control and gesture recognition system.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations of the method described in this implementation can include a non-transitory computer readable storage medium storing instructions executable by a processor to perform any of the methods described above. Yet another implementation of the method described in this implementation can include a system including memory and one or more processors operable to execute instructions, stored in the memory, to perform any of the methods described above.

FIGS. 17-20 illustrate an exemplary machine sensory and control system (MSCS) in implementations.

In one implementation, a motion sensing and controller system provides for detecting that some variation(s) in one or more portions of interest of a user has occurred, for determining that an interaction with one or more machines corresponds to the variation(s), for determining if the interaction should occur, and, if so, for affecting the interaction. The Machine Sensory and Control System (MSCS) typically includes a portion detection system, a variation determination system, an interaction system and an application control system.

Figure 17:
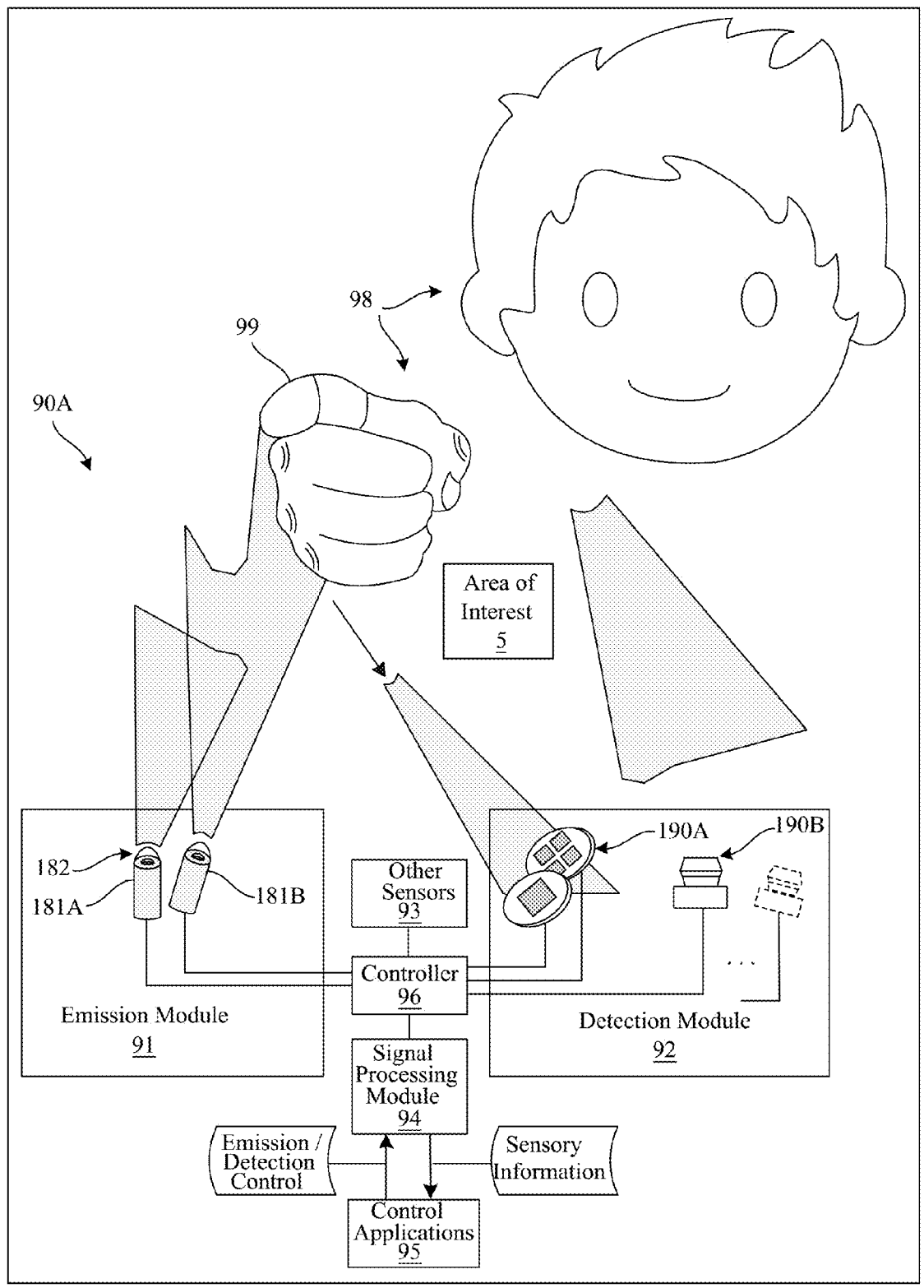
FIG. 17 illustrates an exemplary machine sensory and control system in one implementation.
Figure 18:
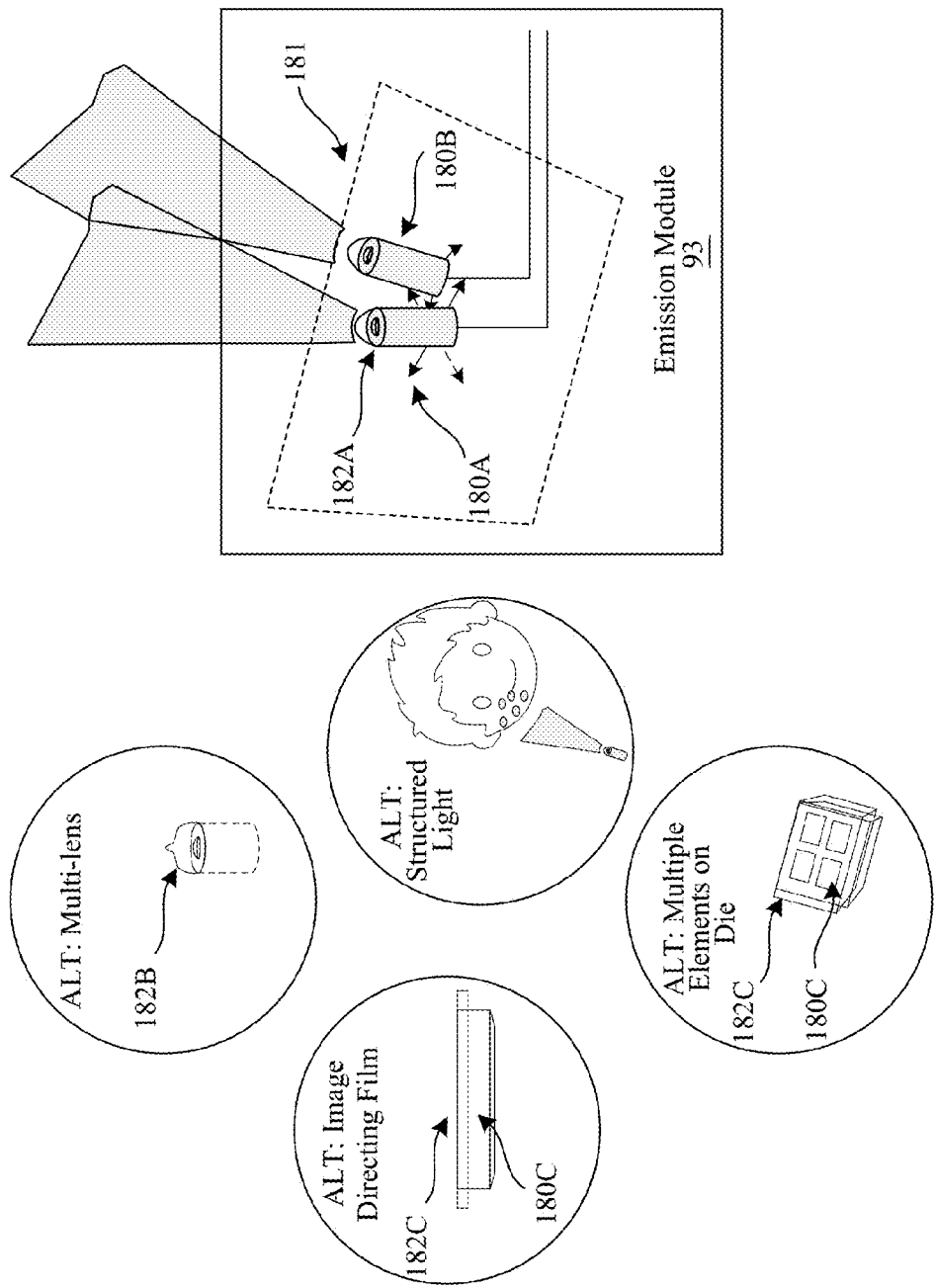
FIG. 18 depicts one implementation of coupling emitters with other materials or devices.
Figure 19:
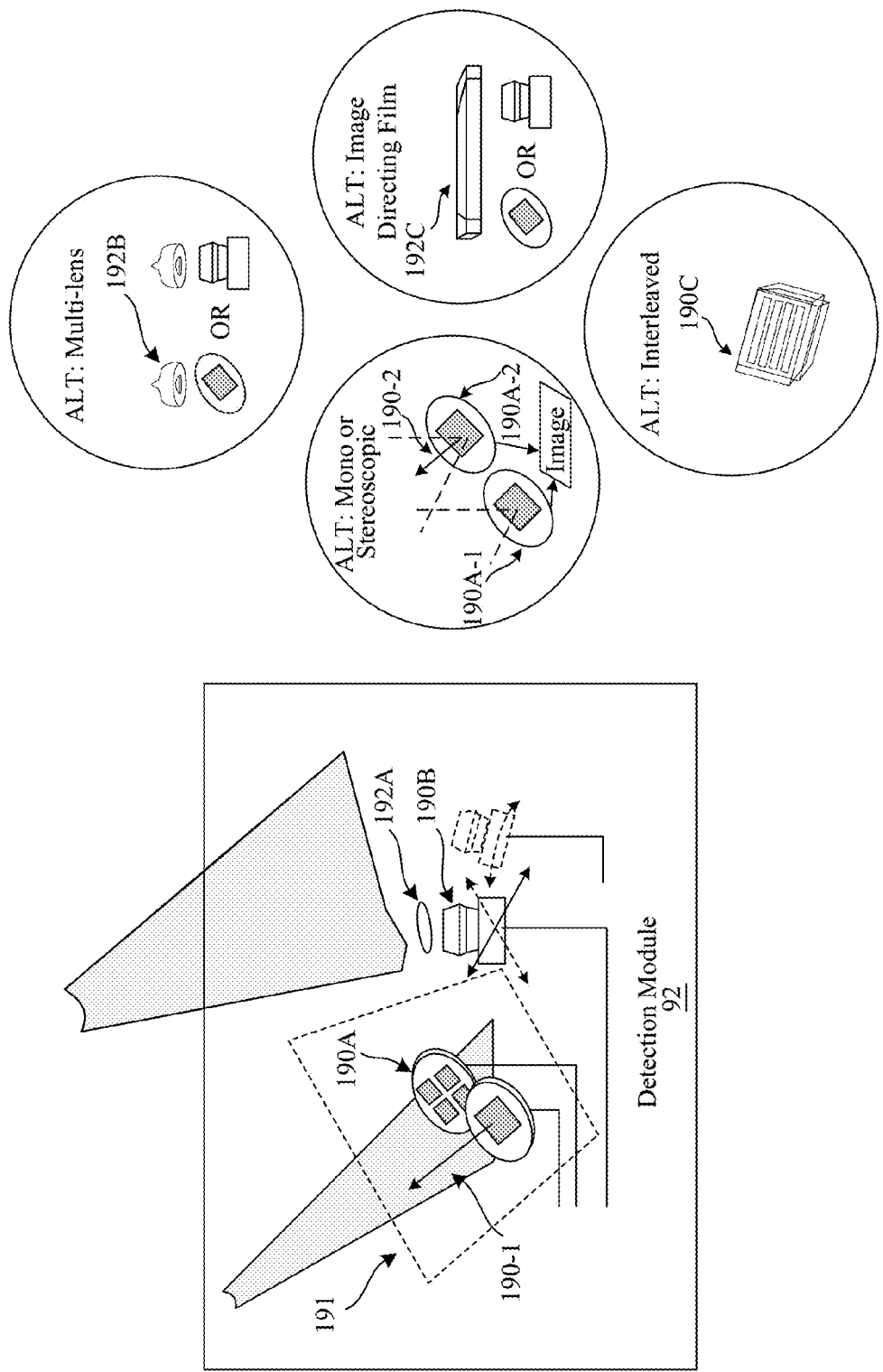
FIG. 19 shows one implementation of interleaving arrays of image capture device(s).

As FIG. 17 shows, one detection system 90A implementation includes an emission module 91, a detection module 92, a controller 96, a processing module 94 and a machine control module 95. In one implementation, the emission module includes one or more emitter(s) 180A, 180B (e.g., LEDs or other devices emitting light in the IR, visible, or other spectrum regions, or combinations thereof; radio and/or other electromagnetic signal emitting devices) that are controllable via emitter parameters (e.g., frequency, activation state, firing sequences and/or patterns, etc.) by the controller 96. However, other existing/emerging emission mechanisms and/or some combination thereof can also be utilized in accordance with the requirements of a particular implementation. The emitters 180A, 180B can be individual elements coupled with materials or devices 182 (and/or materials) (e.g., lenses 182A, multi-lenses 182B (of FIG. 21), image directing film (IDF) 182C (of FIG. 18), liquid lenses, combinations thereof, and/or others) with varying or variable optical properties to direct the emission, one or more arrays 180C of emissive elements (combined on a die or otherwise), with or without the addition of devices 182C for directing the emission, or combinations thereof, and positioned within an emission region 181 (of FIG. 18) according to one or more emitter parameters (i.e., either statically (e.g., fixed, parallel, orthogonal or forming other angles with a work surface, one another or a display or other presentation mechanism) or dynamically (e.g., pivot, rotate and/or translate) mounted, embedded (e.g., within a machine or machinery under control) or otherwise coupleable using an interface (e.g., wired or wireless)). In some implementations, structured lighting techniques can provide improved surface feature capture capability by casting illumination according to a reference pattern onto the object 98. Image capture techniques described in further detail herein can be applied to capture and analyze differences in the reference pattern and the pattern as reflected by the object 98. In yet further implementations, detection system 90A may omit emission module 91 altogether (e.g., in favor of ambient lighting).

In one implementation, the detection module 92 includes one or more capture device(s) 190A, 190B (e.g., light (or other electromagnetic radiation sensitive devices) that are controllable via the controller 96. The capture device(s) 190A, 190B can comprise individual or multiple arrays of image capture elements 190A (e.g., pixel arrays, CMOS or CCD photo sensor arrays, or other imaging arrays) or individual or arrays of photosensitive elements 190B (e.g., photodiodes, photo sensors, single detector arrays, multi-detector arrays, or other configurations of photo sensitive elements) or combinations thereof. Arrays of image capture device(s) 190C (of FIG. 19) can be interleaved by row (or column or a pattern or otherwise addressable singly or in groups). However, other existing/emerging detection mechanisms and/or some combination thereof can also be utilized in accordance with the requirements of a particular implementation. Capture device(s) 190A, 190B each can include a particular vantage point 190-1 from which objects 98 within area of interest 5 are sensed and can be positioned within a detection region 191 (of FIG. 19) according to one or more detector parameters (i.e., either statically (e.g., fixed, parallel, orthogonal or forming other angles with a work surface, one another or a display or other presentation mechanism) or dynamically (e.g. pivot, rotate and/or translate), mounted, embedded (e.g., within a machine or machinery under control) or otherwise coupleable using an interface (e.g., wired or wireless)). Capture devices 190A, 190B can be coupled with devices 192 (and/or materials) (of FIG. 19) (e.g., lenses 192A (of FIG. 19), multi-lenses 192B (of FIG. 19), image directing film (IDF) 192C (of FIG. 19), liquid lenses, combinations thereof, and/or others) with varying or variable optical properties for directing the reflectance to the capture device for controlling or adjusting resolution, sensitivity and/or contrast. Capture devices 190A, 190B can be designed or adapted to operate in the IR, visible, or other spectrum regions, or combinations thereof or alternatively operable in conjunction with radio and/or other electromagnetic signal emitting devices in various applications. In an implementation, capture devices 190A, 190B can capture one or more images for sensing objects 98 and capturing information about the object (e.g., position, motion, etc.). In implementations comprising more than one capture device, particular vantage points of capture devices 190A, 190B can be directed to area of interest 5 so that fields of view 190-2 of the capture devices at least partially overlap. Overlap in the fields of view 190-2 provides capability to employ stereoscopic vision techniques (see, e.g., FIG. 19), including those known in the art to obtain information from a plurality of images captured substantially contemporaneously.

While illustrated with reference to a particular implementation in which control of emission module 91 and detection module 92 are co-located within a common controller 96, it should be understood that these functions will be separate in some implementations, and/or incorporated into one or a plurality of elements comprising emission module 91 and/or detection module 92 in some implementations. Controller 96 comprises control logic (hardware, software or combinations thereof) to conduct selective activation/de-activation of emitter(s) 180A, 180B (and/or control of active directing devices) in on-off, or other activation states or combinations thereof to produce emissions of varying intensities in accordance with a scan pattern which can be directed to scan an area of interest 5. Controller 96 can comprise control logic (hardware, software or combinations thereof) to conduct selection, activation and control of capture device(s) 190A, 190B (and/or control of active directing devices) to capture images or otherwise sense differences in reflectance or other illumination. Signal processing module 94 determines whether captured images and/or sensed differences in reflectance and/or other sensor—perceptible phenomena indicate a possible presence of one or more objects of interest 98, including control objects 99, the presence and/or variations thereof can be used to control machines and/or other applications 95.

In various implementations, the variation of one or more portions of interest of a user can correspond to a variation of one or more attributes (position, motion, appearance, surface patterns) of a user hand 99, finger(s), points of interest on the hand 99, facial portion 98 other control objects (e.g., styli, tools) and so on (or some combination thereof) that is detectable by, or directed at, but otherwise occurs independently of the operation of the machine sensory and control system. Thus, for example, the system is configurable to 'observe' ordinary user locomotion (e.g., motion, translation, expression, flexing, deformation, and so on), locomotion directed at controlling one or more machines (e.g., gesturing, intentionally system-directed facial contortion, etc.), attributes thereof (e.g., rigidity, deformation, fingerprints, veins, pulse rates and/or other biometric parameters). In one implementation, the system provides for detecting that some variation(s) in one or more portions of interest (e.g., fingers, fingertips, or other control surface portions) of a user has occurred, for determining that an interaction with one or more machines corresponds to the variation(s), for determining if the interaction should occur, and, if so, for at least one of initiating, conducting, continuing, discontinuing and/or modifying the interaction and/or a corresponding interaction.

Figure 20:
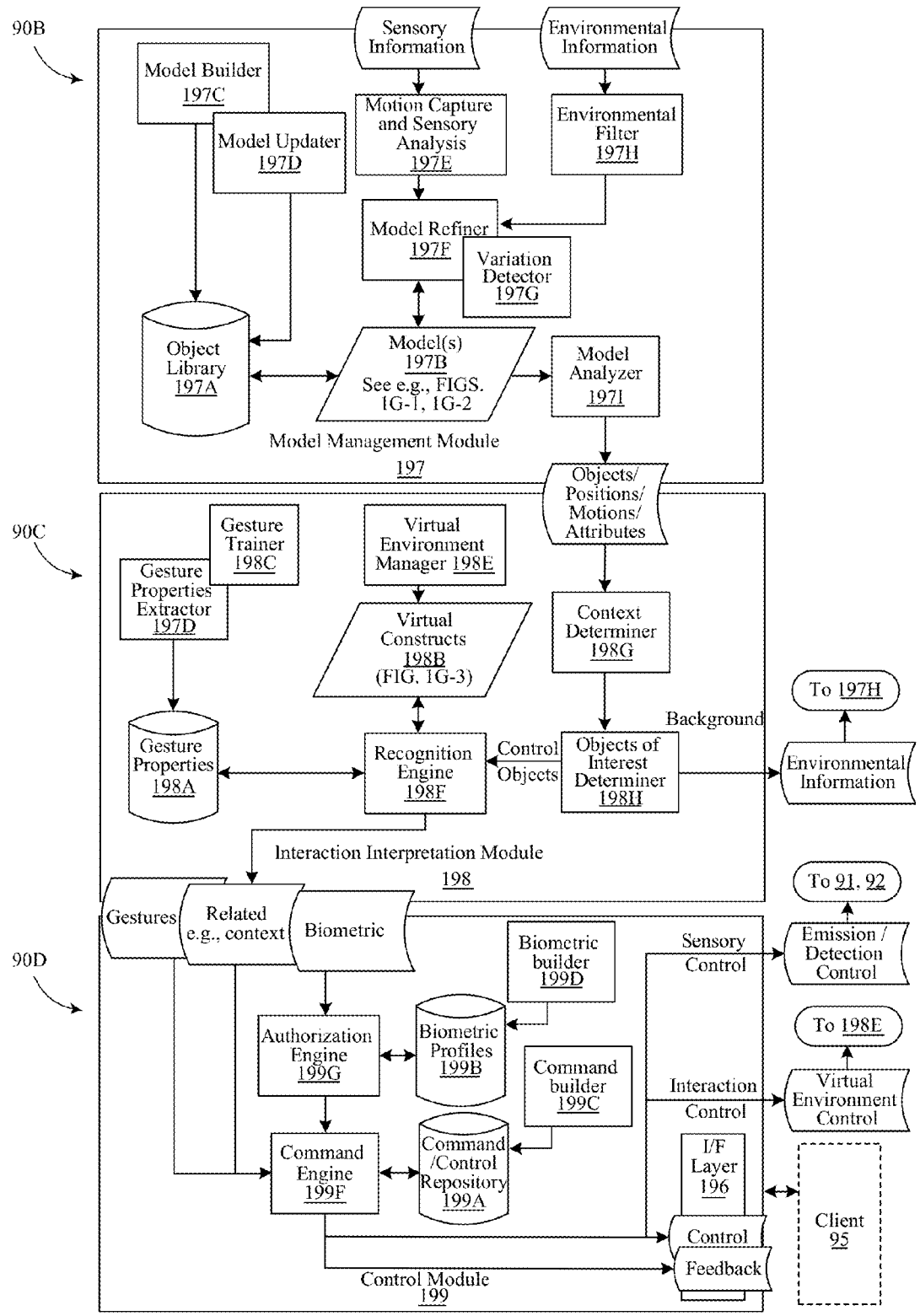
FIG. 20 shows another implementation of an exemplary machine sensory and control system.

For example and with reference to FIG. 20, a variation determination system 90B implementation comprises a model management module 197 that provides functionality to build, modify, customize one or more models to recognize variations in objects, positions, motions and attribute state and/or change in attribute state (of one or more attributes) from sensory information obtained from detection system 90A. A motion capture and sensory analyzer 197E finds motions (i.e., translational, rotational), conformations, and presence of objects within sensory information provided by detection system 90A. The findings of motion capture and sensory analyzer 197E serve as input of sensed (e.g., observed) information from the environment with which model refiner 197F can update predictive information (e.g., models, model portions, model attributes, etc.).

A model management module 197 implementation comprises a model refiner 197F to update one or more models 197B (or portions thereof) from sensory information (e.g., images, scans, other sensory-perceptible phenomenon) and environmental information (i.e., context, noise, etc.); enabling a model analyzer 197I to recognize object, position, motion and attribute information that might be useful in controlling a machine. Model refiner 197F employs an object library 197A to manage objects including one or more models 197B (i.e., of user portions (e.g., hand, face), other control objects (e.g., styli, tools)) or the like (see e.g., model 197B-1, 197B), model components (i.e., shapes, 2D model portions that sum to 3D, outlines 194 and/or outline portions 194A, 194B (i.e., closed curves), attributes 197-5 (e.g., attach points, neighbors, sizes (e.g., length, width, depth), rigidity/flexibility, torsional rotation, degrees of freedom of motion and others) and so forth) (see e.g., 197B-1-197B-2), useful to define and update models 197B, and model attributes 197-5. While illustrated with reference to a particular implementation in which models, model components and attributes are co-located within a common object library 197A, it should be understood that these objects will be maintained separately in some implementations.

In an implementation, when the control object morphs, conforms, and/or translates, motion information reflecting such motion(s) is included into the observed information. Points in space can be recomputed based on the new observation information. The model subcomponents can be scaled, sized, selected, rotated, translated, moved, or otherwise re-ordered to enable portions of the model corresponding to the virtual surface(s) to conform within the set of points in space.

In an implementation, motion(s) of the control object can be rigid transformation, in which case, points on the virtual surface(s) remain at the same distance(s) from one another through the motion. Motion(s) can be non-rigid transformations, in which points on the virtual surface(s) can vary in distance(s) from one another during the motion. In an implementation, observation information can be used to adjust (and/or recomputed) predictive information thereby enabling "tracking" the control object. In implementations, control object can be tracked by determining whether a rigid transformation or a non-rigid transformation occurs. In an implementation, when a rigid transformation occurs, a transformation matrix is applied to each point of the model uniformly. Otherwise, when a non-rigid transformation occurs, an error indication can be determined, and an error minimization technique such as described herein above can be applied. In an implementation, rigid transformations and/or non-rigid transformations can be composed. One example composition implementation includes applying a rigid transformation to predictive information. Then an error indication can be determined, and an error minimization technique such as described herein above can be applied. In an implementation, determining a transformation can include calculating a rotation matrix that provides a reduced RMSD (root mean squared deviation) between two paired sets of points. One implementation can include using Kabsch Algorithm to produce a rotation matrix. In an implementation and by way of example, one or more force lines can be determined from one or more portions of a virtual surface.

Figure 21:
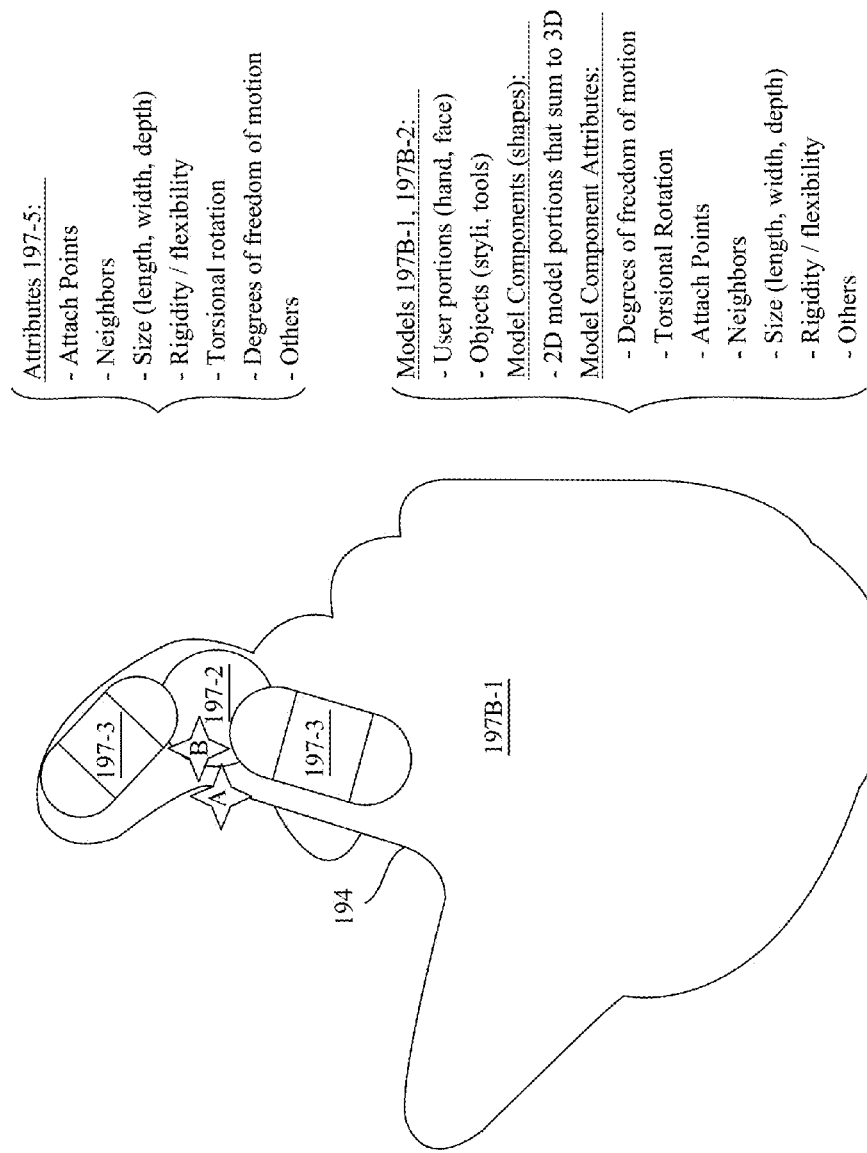
FIGS. 21 and 22 illustrate prediction information including models of different control objects.

FIG. 21 illustrates prediction information including a model 197B-1 of a control object (e.g., FIG. 17: 99) constructed from one or more model subcomponents 197-2, 197-3 selected and/or configured to represent at least a portion of a surface of control object 99, a virtual surface portion 194 and one or more attributes 197-5. Other components can be included in prediction information 197B-1 not shown in FIG. 21 for clarity sake. In an implementation, the model subcomponents 197-2, 197-3 can be selected from a set of radial solids, which can reflect at least a portion of a control object 99 in terms of one or more of structure, motion characteristics, conformational characteristics, other types of characteristics of control object 99, and/or combinations thereof. In one implementation, radial solids include a contour and a surface defined by a set of points having a fixed distance from the closest corresponding point on the contour. Another radial solid implementation includes a set of points normal to points on a contour and a fixed distance therefrom. In an implementation, computational technique(s) for defining the radial solid include finding a closest point on the contour and the arbitrary point, then projecting outward the length of the radius of the solid. In an implementation, such projection can be a vector normal to the contour at the closest point. An example radial solid (e.g., 197-3) includes a "capsuloid", i.e., a capsule shaped solid including a cylindrical body and semi-spherical ends. Another type of radial solid (e.g., 197-2) includes a sphere. Other types of radial solids can be identified based on the foregoing teachings.

One or more attributes 197-5 can define characteristics of a model subcomponent 197-3. Attributes can include e.g., attach points, neighbors, sizes (e.g., length, width, depth), rigidity, flexibility, torsion, zero or more degrees of freedom of motion with respect to one or more defined points, which can include endpoints for example, and other attributes defining a salient characteristic or property of a portion of control object 99 being modeled by predictive information 197B-1. In an implementation, predictive information about the control object can include a model of the control object together with attributes defining the model and values of those attributes.

In an implementation, observation information including observation of the control object can be compared against the model at one or more of periodically, randomly or substantially continuously (i.e., in real time). Observational information can include without limitation observed values of attributes of the control object corresponding to the attributes of one or more model subcomponents in the predictive information for the control object. In an implementation, comparison of the model with the observation information provides an error indication. In an implementation, an error indication can be computed by determining a closest distance determined between a first point A belonging to a set of points defining the virtual surface 194 and a second point B belonging to a model subcomponent 197-2 determined to be corresponding to the first point (e.g., nearest to the first point for example). In an implementation, the error indication can be applied to the predictive information to correct the model to more closely conform to the observation information. In an implementation, error indication can be applied to the predictive information repeatedly until the error indication falls below a threshold, a measure of conformance with the observation information rises above a threshold, or a fixed or variable number of times, or a fixed or variable number of times per time period, or combinations thereof.

Figure 22:
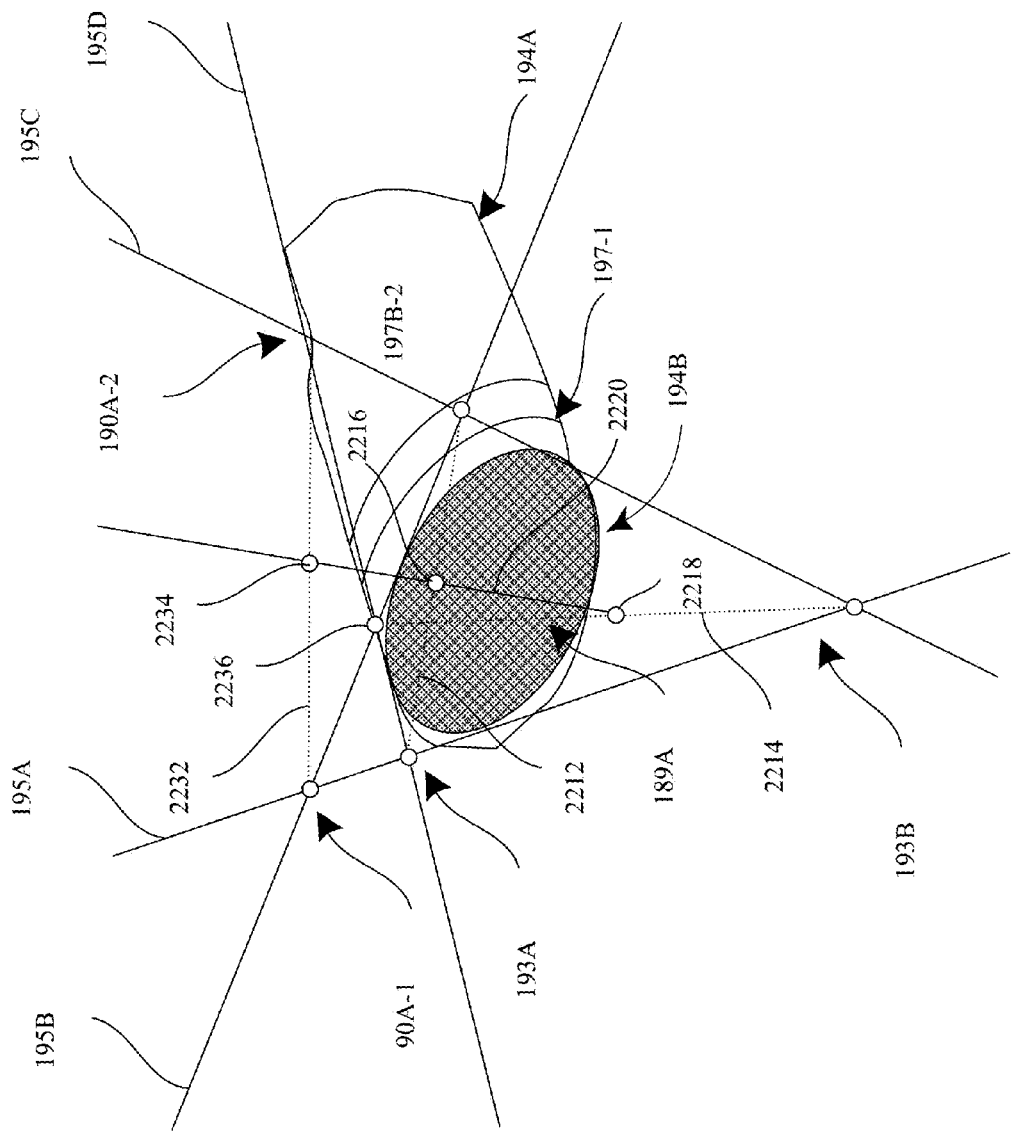

In an implementation and with reference to FIGS. 17, 22, updating predictive information to observed information comprises selecting one or more sets of points (e.g., FIG. 22:193A, 193B) in space surrounding or bounding the control object within a field of view of one or more image capture device(s). As shown by FIG. 22, points 193 can be determined using one or more sets of lines 195A, 195B, 195C, and 195D originating at vantage point(s) (e.g., FIG. 17: 190-1, 190-2) associated with the image capture device(s) (e.g., FIG. 17: 190A-1, 190A-2) and determining therefrom one or more intersection point(s) defining a bounding region (i.e., region formed by lines FIG. 22: 195A, 195B, 195C, and 195D) surrounding a cross-section of the control object. The bounding region can be used to define a virtual surface (FIG. 22: 194) to which model subcomponents 197-1, 197-2, 197-3, and 197-4 can be compared. The virtual surface 194 can include a visible portion 194A and a non-visible "inferred" portion 194B. Virtual surfaces 194 can include straight portions and/or curved surface portions of one or more virtual solids (i.e., model portions) determined by model refiner 197F.

For example and according to one implementation illustrated by FIG. 22, model refiner 197F determines to model subcomponent 197-1 of an object portion (happens to be a finger) using a virtual solid, an ellipse in this illustration, or any of a variety of 3D shapes (e.g., ellipsoid, sphere, or custom shape) and/or 2D slice(s) that are added together to form a 3D volume. Accordingly, beginning with generalized equations for an ellipse (1) with (x, y) being the coordinates of a point on the ellipse, $(x_C, y_C)$ the center, a and b the axes, and θ the rotation angle. The coefficients $C_1$, $C_2$ and $C_3$ are defined in terms of these parameters, as shown:

$$C_1 x^2 + C_2 xy + C_3 y^2 - (2C_1 x_c + C_2 y_c)x - \qquad (1)$$
$$(2C_3 y_c + C_2 x_c)y + (C_1 x_c^2 + C_2 x_c y_c + C_3 y_c^2 - 1) = 0$$

$$C_1 = \frac{\cos^2\theta}{a^2} + \frac{\sin^2\theta}{b^2}$$

$$C_2 = -2\cos\theta\sin\theta\left(\frac{1}{a^2} - \frac{1}{b^2}\right)$$

$$C_3 = \frac{\sin^2\theta}{a^2} + \frac{\cos^2\theta}{b^2}$$

The ellipse equation (1) is solved for θ, subject to the constraints that: (1) $(x_C, y_C)$ must lie on the centerline determined from the four tangents 195A, 195B, 195C, and 195D (i.e., centerline 189A of FIG. 22); and (2) a is fixed at the assumed value $a_0$. The ellipse equation can either be solved for θ analytically or solved using an iterative numerical solver (e.g., a Newtonian solver as is known in the art). An analytic solution can be obtained by writing an equation for the distances to the four tangent lines given a $y_C$ position, then solving for the value of $y_C$ that corresponds to the desired radius parameter $a=a_0$. Accordingly, equations (2) for four tangent lines in the x-y plane (of the slice), in which coefficients $A_i$, $B_i$ and $D_i$ (for i=1 to 4) are determined from the tangent lines 195A, 195B, 195C, and 195D identified in an image slice as described above.

$$A_1 x + B_1 y + D_1 = 0$$
$$A_2 x + B_2 y + D_2 = 0$$
$$A_3 x + B_3 y + D_3 = 0$$
$$A_4 x + B_4 y + D_4 = 0 \qquad (2)$$

Four column vectors $r_{12}$, $r_{23}$, $r_{14}$ and $r_{24}$ are obtained from the coefficients $A_i$, $B_i$ and $D_i$ of equations (2) according to equations (3), in which the "\" operator denotes matrix left division, which is defined for a square matrix M and a column vector v such that M\v=r, where r is the column vector that satisfies Mr=v:

$$r_{13} = \begin{bmatrix} A_1 & B_1 \\ A_3 & B_3 \end{bmatrix} \backslash \begin{bmatrix} -D_1 \\ -D_3 \end{bmatrix} \qquad (3)$$

$$r_{23} = \begin{bmatrix} A_2 & B_2 \\ A_3 & B_3 \end{bmatrix} \backslash \begin{bmatrix} -D_{21} \\ -D_3 \end{bmatrix}$$

$$r_{14} = \begin{bmatrix} A_1 & B_1 \\ A_4 & B_4 \end{bmatrix} \backslash \begin{bmatrix} -D_1 \\ -D_4 \end{bmatrix}$$

$$r_{24} = \begin{bmatrix} A_2 & B_2 \\ A_4 & B_4 \end{bmatrix} \backslash \begin{bmatrix} -D_2 \\ -D_4 \end{bmatrix}$$

Four component vectors G and H are defined in equations (4) from the vectors of tangent coefficients A, B and D and scalar quantities p and q, which are defined using the column vectors $r_{12}$, $r_{23}$, $r_{14}$ and $r_{24}$ from equations (3).

$$c1 = (r_{13} + r_{24})/2$$

$$c2 = (r_{14} + r_{23})/2$$

$$\delta 1 = c2_1 - c1_1$$

$$\delta 2 = c2_2 - c1_2$$

$$p = \delta 1/\delta 2$$

$$q = c1_1 \cdot c1_2 \ast p$$

$$G = Ap + B$$

$$H = Aq + D \qquad (4)$$

Six scalar quantities $v_{A2}$, $v_{AB}$, $v_{B2}$, $w_{A2}$, $w_{AB}$, and $w_{B2}$ are defined by equation (5) in terms of the components of vectors G and H of equation (4).

$$v = \begin{bmatrix} G_2^2 & G_3^2 & G_4^2 \\ (G_2 H_2)^2 & (G_3 H_3)^2 & (G_4 H_4)^2 \\ H_2^2 & H_3^2 & H_4^2 \end{bmatrix} \backslash \begin{bmatrix} 0 \\ 0 \\ 1 \end{bmatrix} \qquad (5)$$

$$w = \begin{bmatrix} G_2^2 & G_3^2 & G_4^2 \\ (G_2 H_2)^2 & (G_3 H_3)^2 & (G_4 H_4)^2 \\ H_2^2 & H_3^2 & H_4^2 \end{bmatrix} \backslash \begin{bmatrix} 0 \\ 1 \\ 0 \end{bmatrix}$$

$$v_{A2} = (v_1 A_1)^2 + (v_2 A_2)^2 + (v_3 A_3)^2$$

$$v_{AB} = (v_1 A_1 B_1)^2 + (v_2 A_2 B_2)^2 + (v_3 A_3 B_3)^2$$

$$v_{B2} = (v_1 B_1)^2 + (v_2 B_2)^2 + (v_3 B_3)^2$$

$$w_{A2} = (w_1 A_1)^2 + (w_2 A_2)^2 + (w_3 A_3)^2$$

$$w_{AB} = (w_1 A_1 B_1)^2 + (w_2 A_2 B_2)^2 + (w_3 A_3 B_3)^2$$

$$w_{B2} = (w_1 B_1)^2 + (w_2 B_2)^2 + (w_3 B_3)^2$$

Using the parameters defined in equations (1)-(5), solving for θ is accomplished by solving the eighth-degree polynomial equation (6) for t, where the coefficients $Q_i$ (for i=0 to 8) are defined as shown in equations (7)-(15).

$$0 = Q_8 t^8 + Q_7 t^7 + Q_6 t^6 + Q_5 t^5 + Q_4 t^4 + Q_3 t^3 + Q_2 t^2 + Q_1 t + Q_0 \qquad (6)$$

The parameters $A_1$, $B_1$, $G_1$, $H_1$, $v_{A2}$, $v_{AB}$, $v_{B2}$, $w_{A2}$, $w_{AB}$, and $w_{B2}$ used in equations (7)-(15) are defined as shown in equations (1)-(4). The parameter n is the assumed semi-major axis (in other words, $a_0$). Once the real roots t are known, the possible values of θ are defined as θ=a tan(t).

$$Q_8 = 4A_1^2 n^2 v_{B2}^2 + 4v_{B2} B_1^2 (1 - n^2 v_{A2}) - (G_1(1 - n^2 v_{A2}) w_{B2} + n^2 v_{B2} w_{A2} + 2H_1 v_{B2})^2 \qquad (7)$$

$$Q_7 = -(2(2n^2 v_{AB} w_{A2} + 4H_1 v_{AB} + 2G_1 n^2 v_{AB} w_{B2} + 2G_1(1 - n^2 v_{A2}) w_{AB}))(G_1(1 - n^2 v_{A2}) w_{B2} + n^2 v_{B2} w_{A2} + 2H_1 v_{B2}) - \qquad (8)$$
$$8A_1 B_1 n^2 v_{B2}^2 + 16A_1^2 n^2 v_{AB} v_{B2} + (4(2A_1 B_1 (1 - n^2 v_{A2}) + 2B_1^2 n^2 v_{AB})) v_{B2} + 8B_1^2 (1 - n^2 v_{A2}) v_{AB}$$

$$Q_6 = \qquad (9)$$
$$-(2(H_1 v_{B2} + 2H_1 v_{A2} + n^2 v_{A2} w_{A2} + n^2 v_{B2}(-2w_{AB} + w_{B2}) + G_1(n^2 v_{B2} + 1) w_{B2} + 4G_1 n^2 v_{AB} w_{AB} + G_1(1 - n^2 v_{A2}) v_{A2})) \times$$
$$(G_1(1 - n^2 v_{A2}) w_{B2} + n^2 v_{B2} w_{A2} + 2H_1 v_{B2}) - (2n^2 v_{AB} w_{A2} + 4H_1 v_{AB} + 2G_1 n^2 v_{AB} w_{B2} + 2G_1(1 - n^2 v_{A2}) w_{AB})^2 +$$
$$4B_1^2 n^2 v_{B2}^2 - 32A_1 B_1 n^2 v_{AB} v_{B2} + 4A_1^2 n^2 (2v_{A2} v_{B2} + 4v_{AB}^2) + 4A_1^2 n^2 v_{B2}^2 +$$
$$(4(A_1^2(1 - n^2 v_{A2}) + 4A_1 B_1 n^2 v_{AB} + B_1^2(-n^2 v_{B2} + 1) + B_1^2(1 - n^2 v_{A2}))) v_{B2} +$$
$$(8(2A_1 B_1 (1 - n^2 v_{A2}) + 2B_1^2 n^2 v_{AB})) v_{AB} + 4B_1^2(1 - n^2 v_{A2}) v_{A2}$$

$$Q_5 = -(2(4H_1 v_{AB} + 2G_1(-n^2 v_{B2} + 1) w_{AB} + 2G_1 n^2 v_{AB} v_{A2} + 2n^2 v_A(-2w_{AB} + w_{B2}))) \qquad (10)$$
$$(G_1(1 - n^2 v_{A2}) w_{B2} + n^2 v_{B2} w_{A2} + 2H_1 v_{B2}) -$$
$$(2(2H_1 v_{B2} + 2H_1 v_{A2} + n^2 v_{A2} w_{A2} + n^2 v_{B2}(-2w_{AB} + w_{B2}) + G_1(-n^2 v_{B2} + 1) w_{B2} + 4G_1 n^2 v_{AB} w_{AB} + G_1(1 - n^2 v_{A2}) v_{A2})) \times$$
$$(2n^2 v_{AB} w_{A2} + 4H_1 v_{AB} + 2G_1 n^2 v_{AB} w_{B2} + 2G_1(1 - n^2 v_{A2}) w_{AB}) + 16B_1^2 n^2 v_{AB} v_{B2} -$$
$$8A_1 B_1 n^2 (2v_{A2} v_{B2} + 4v_{AB}^2) + 16A_1^2 n^2 v_{A2} v_{AB} - 8A_1 B_1 n^2 v_{B2}^2 + 16A_1^2 n^2 v_{AB} v_{B2} +$$
$$(4(2A_1^2 n^2 v_{AB} + 2A_1 B_1 (-n^2 v_{B2} + 1) + 2A_1 B_1 (1 - n^2 v_{A2}) + 2B_1^2 n^2 v_{AB})) v_{B2} +$$
$$(8(A_1^2(1 - n^2 v_{A2}) + 4A_1 B_1 n^2 v_{AB} + B_1^2(-n^2 v_{B2} + 1) + B_1^2(1 - n^2 v_{A2}))) v_{AB} + (4(2A_1 B_1 (1 - n^2 v_{A2}) + 2B_1^2 n^2 v_{AB})) v_{A2}$$

$$Q_4 = (4(A_1^2(-n^2 v_{B2}) + A_1^2(1 - n^2 v_{A2}) + 4A_1 B_1 n^2 v_{AB} + B_1^2(-n^2 v_{B2} + 1))) v_{B2} + \qquad (11)$$
$$(8(2A_1^2 n^2 v_{AB} + 2A_1 B_1 (-n^2 v_{B2} + 1) + 2A_1 B_1 (1 - n^2 v_{A2}) + 2B_1^2 n^2 v_{AB})) v_{AB} +$$
$$(4(A_1^2(1 - n^2 v_{A2}) + 4A_1 B_1 n^2 v_{AB} + B_1^2(-n^2 v_{B2} + 1) + B_1^2(1 - n^2 v_{A2}))) v_{A2} + 4B_1^2 n^2 v_{A2}^2 + 4B_1^2 n^2 (2v_{A2} v_{B2} + 4v_{AB}^2) -$$
$$32A_1 B_1 n^2 v_{A2} v_{AB} + 4A_1^2 n^2 v_{A2}^2 + 4B_1^2 n^2 v_{B2}^2 \cdot 32A_1 B_1 n^2 v_{AB} v_{B2} + 4A_1^2 n^2 (2v_{A2} v_{B2} + 4v_{AB}^2) -$$
$$(2(G_1(-n^2 v_{B2} + 1) v_{A2} + n^2 v_{A2}(-2w_{AB} + w_{B2}) + 2H_1 v_{A2}))(G_1(1 - n^2 v_{A2}) w_{B2} + n^2 v_{B2} w_{A2} + 2H_1 v_{B2}) -$$
$$(2(4H_1 v_{AB} + 2G_1(-n^2 v_{B2} + 1) w_{AB} + 2G_1 n^2 v_{AB} v_{A2} + 2n^2 v_{AB}(-2w_{AB} + w_{B2}))) \times$$
$$(2n^2 v_{AB} w_{A2} + 4H_1 v_{AB} + 2G_1 n^2 v_{AB} w_{B2} + 2G_1(1 - n^2 v_{A2}) w_{AB}) -$$
$$(2H_1 v_{B2} + 2H_1 v_{A2} + n^2 v_{A2} w_{A2} + n^2 v_{B2}(-2w_{AB} + w_{B2}) + G_1(-n^2 v_{B2} + 1) w_{B2} + 4G_1 n^2 v_{AB} w_{AB} + G_1(1 - n^2 v_{A2}) v_{A2})^2$$

$$Q_3 = -(2(G_1(-n^2 v_{B2} + 1) v_{A2} + n^2 v_{A2}(-2w_{AB} + w_{B2}) + 2H_1 v_{A2})) \qquad (12)$$
$$(2n^2 v_{AB} w_{A2} + 4H_1 v_{AB} + 2G_1 n^2 v_{AB} w_{B2} + 2G_1(1 - n^2 v_{A2}) w_{AB}) -$$
$$(2(4H_1 v_{AB} + 2G_1(-n^2 v_{B2} + 1) w_{AB} + 2G_1 n^2 v_{AB} v_{A2} + 2n^2 v_{AB}(-2w_{AB} + w_{B2}))) \times$$
$$(2H_1 v_{B2} + 2H_1 v_{A2} + n^2 v_{A2} w_{A2} + n^2 v_{B2}(-2w_{AB} + w_{B2}) + G_1(-n^2 v_{B2} + 1) w_{B2} + 4G_1 n^2 v_{AB} w_{AB} + G_1(1 - n^2 v_{A2}) v_{A2}) +$$
$$16B_1^2 n^2 v_{A2} v_{AB} - 8A_1 B_1 n^2 v_{A2}^2 + 16B_1^2 n^2 v_{AB} v_{B2} - 6A_1 B_1 n^2 (2v_{A2} v_{B2} + 4v_{AB}^2) + 16A_1^2 n^2 v_{A2} v_{AB} +$$
$$(4(2A_1^2 n^2 v_{AB} + 2A_1 B_1 (-n^2 v_{B2} + 1))) v_{B2} + (8(A_1^2(-n^2 v_{B2} + 1) + A_1^2(1 - n^2 v_{A2}) + 4A_1 B_1 n^2 v_{AB} + B_1(-^2 n^2 v_{B2} + 1))) v_{AB} +$$
$$(4(2A_1^2 n^2 v_{AB} + 2A_1 B_1 (-n^2 v_{B2} + 1) + 2A_1 B_1 (1 - n^2 v_{A2}) + 2B_1^2 n^2 v_{AB})) v_{A2}$$

$$Q_2 = 4A_1^2(-n^2 v_{B2} + 1) v_{B2} + (8(2A_1^2 n^2 v_{AB} + 2A_1 B_1 (-n^2 v_{B2} + 1))) v_{AB} + \qquad (13)$$
$$(4(A_1^2(-n^2 v_{B2} + 1) + A_1^2(1 - n^2 v_{A2}) + 4A_1 B_1 n^2 v_{AB} + B_1^2(-n^2 v_{B2} + 1))) v_{A2} + 4B_1^2 n^2 v_{A2}^2 + 4B_1^2 n^2 (2v_{A2} v_{B2} + 4v_{AB}^2) -$$
$$32A_1 B_1 n^2 v_{A2} v_{AB} + 4A_1^2 n^2 v_{A2}^2 - (2(G_1(-n^2 v_{B2} + 1) v_{A2} + n^2 v_{A2}(-2w_{AB} + w_{B2}) + 2H_1 v_{A2})) \times$$
$$(2H_1 v_{B2} + 2H_1 v_{A2} + n^2 v_{A2} w_{A2} + n^2 v_{B2}(-2w_{AB} + w_{B2}) + G_1(-n^2 v_{B2} + 1) w_{B2} + 4G_1 n^2 v_{AB} w_{AB} + G_1(1 - n^2 v_{A2}) v_{A2}) -$$
$$(4H_1 v_{AB} + 2G_1(-n^2 v_{B2} + 1) w_{AB} + 2G_1 n^2 v_{AB} v_{A2} + 2n^2 v_{AB}(-2w_{AB} + w_{B2}))^2$$

$$Q_1 = 8A_1^2(-n^2 v_{B2} + 1) v_{AB} + (4(2A_1^2 n^2 v_{AB} + 2A_1 B_1 (-n^2 v_{B2} + 1))) v_{A2} + \qquad (14)$$
$$16B_1^2 n^2 v_{A2} v_{AB} - 8A_1 B_1 n^2 v_{A2}^2 - (2(G_1(-n^2 v_{B2} + 1) v_{A2} + n^2 v_{A2}(-2w_{AB} + w_{B2}) + 2H_1 v_{A2}))$$
$$(4H_1 v_{AB} + 2G_1(-n^2 v_{B2} + 1) w_{AB} + 2G_1 n^2 v_{AB} v_{A2} + 2n^2 v_{AB}(-2w_{AB} + w_{B2}))$$

$$Q_0 = 4A_1^2(-n^2 v_{B2} + 1) v_{A2} - (G_1(-n^2 v_{B2} + 1) v_{A2} + n^2 v_{A2}(-2w_{AB} + w_{B2}) + 2H_1 v_{A2})^2 + 4B_1^2 n^2 v_{A2}^2 \qquad (15)$$

In this exemplary implementation, equations (6)-(15) have at most three real roots; thus, for any four tangent lines, there are at most three possible ellipses that are tangent to all four lines and that satisfy the $a=a_0$ constraint. (In some instances, there may be fewer than three real roots.) For each real root θ, the corresponding values of $(x_C, y_C)$ and b can be readily determined. Depending on the particular inputs, zero or more solutions will be obtained; for example, in some instances, three solutions can be obtained for a typical configuration of tangents. Each solution is completely characterized by the parameters {θ, $a=a_0$, b, $(x_C, y_C)$}. Alternatively, or additionally, a model builder 197C and model updater 197D provide functionality to define, build and/or customize model(s) 197B using one or more components in object library 197A. Once built, model refiner 197F updates and refines the model, bringing the predictive information of the model in line with observed information from the detection system 90A.

The model subcomponents 197-1, 197-2, 197-3, and 197-4 can be scaled, sized, selected, rotated, translated, moved, or otherwise re-ordered to enable portions of the model corresponding to the virtual surface(s) to conform within the points 193 in space. Model refiner 197F employs a variation detector 197G to substantially continuously determine differences between sensed information and predictive information and provide to model refiner 197F a variance useful to adjust the model 197B accordingly. Variation detector 197G and model refiner 197F are further enabled to correlate among model portions to preserve continuity with characteristic information of a corresponding object being modeled, continuity in motion, and/or continuity in deformation, conformation and/or torsional rotations.

An environmental filter 197H reduces extraneous noise in sensed information received from the detection system 90A using environmental information to eliminate extraneous elements from the sensory information. Environmental filter 197H employs contrast enhancement, subtraction of a difference image from an image, software filtering, and background subtraction (using background information provided by objects of interest determiner 198H (see below) to enable model refiner 197F to build, refine, manage and maintain model(s) 197B of objects of interest from which control inputs can be determined.

A model analyzer 197I determines that a reconstructed shape of a sensed object portion matches an object model in an object library; and interprets the reconstructed shape (and/or variations thereon) as user input. Model analyzer 197I provides output in the form of object, position, motion and attribute information to an interaction system 90C.

Again with reference to FIG. 20, an interaction system 90C includes an interaction interpretation module 198 that provides functionality to recognize command and other information from object, position, motion and attribute information obtained from variation system 90B. An interaction interpretation module 198 implementation comprises a recognition engine 198F to recognize command information such as command inputs (i.e., gestures and/or other command inputs (e.g., speech, etc.)), related information (i.e., biometrics), environmental information (i.e., context, noise, etc.) and other information discernable from the object, position, motion and attribute information that might be useful in controlling a machine. Recognition engine 198F employs gesture properties 198A (e.g., path, velocity, acceleration, etc.), control objects determined from the object, position, motion and attribute information by an objects of interest determiner 198H and optionally one or more virtual constructs 198B (see e.g. 8-4: 198B-1, 198B-2) to recognize variations in control object presence or motion indicating command information, related information, environmental information and other information discernable from the object, position, motion and attribute information that might be useful in controlling a machine. With reference to FIG. 20-3, virtual construct 198B-1, 198B-2 implement an engagement target with which a control object 99 interacts—enabling MSCS 189 to discern variations in control object (i.e., motions into, out of or relative to virtual construct 198B) as indicating control or other useful information. A gesture trainer 198C and gesture properties extractor 198D provide functionality to define, build and/or customize gesture properties 198A.

A context determiner 198G and object of interest determiner 198H provide functionality to determine from the object, position, motion and attribute information objects of interest (e.g., control objects, or other objects to be modeled and analyzed), objects not of interest (e.g., background) based upon a detected context. For example, when the context is determined to be an identification context, a human face will be determined to be an object of interest to the system and will be determined to be a control object. On the other hand, when the context is determined to be a fingertip control context, the finger tips will be determined to be object(s) of interest and will be determined to be a control objects whereas the user's face will be determined not to be an object of interest (i.e., background). Further, when the context is determined to be a styli (or other tool) held in the fingers of the user, the tool tip will be determined to be object of interest and a control object whereas the user's fingertips might be determined not to be objects of interest (i.e., background). Background objects can be included in the environmental information provided to environmental filter 197H of model management module 197.

A virtual environment manager 198E provides creation, selection, modification and de-selection of one or more virtual constructs 198B. In some implementations, virtual constructs (e.g., a virtual object defined in space; such that variations in real objects relative to the virtual construct, when detected, can be interpreted for control or other purposes are used to determine variations (i.e., virtual "contact" with the virtual construct, breaking of virtual contact, motion relative to a construct portion, etc.) to be interpreted as engagements, dis-engagements, motions relative to the construct(s), and so forth, enabling the system to interpret pinches, pokes and grabs, and so forth. Interaction interpretation module 198 provides as output the command information, related information and other information discernable from the object, position, motion and attribute information that might be useful in controlling a machine from recognition engine 198F to an application control system 90D.

An environmental filter 197H reduces extraneous noise in sensed information received from the detection system 90A using environmental information to eliminate extraneous elements from the sensory information. Environmental filter 197H employs contrast enhancement, subtraction of a difference image from an image, software filtering, and background subtraction (using background information provided by objects of interest determiner 198H (see below) to enable model refiner 197F to build, refine, manage and maintain model(s) 197B of objects of interest from which control inputs can be determined.

A model analyzer 197I determines that a reconstructed shape of a sensed object portion matches an object model in an object library; and interprets the reconstructed shape (and/or variations thereon) as user input. Model analyzer 197I provides output in the form of object, position, motion and attribute information to an interaction system 90C.

Again with reference to FIG. 20, an interaction system 90C includes an interaction interpretation module 198 that provides functionality to recognize command and other information from object, position, motion and attribute information obtained from variation system 90B. An interaction interpretation module 198 implementation comprises a recognition engine 198F to recognize command information such as command inputs (i.e., gestures and/or other command inputs (e.g., speech, etc.)), related information (i.e., biometrics), environmental information (i.e., context, noise, etc.) and other information discernable from the object, position, motion and attribute information that might be useful in controlling a machine. Recognition engine 198F employs gesture properties 198A (e.g., path, velocity, acceleration, etc.), control objects determined from the object, position, motion and attribute information by an objects of interest determiner 198H and optionally one or more virtual constructs 198B (see e.g. 198B-1, 198B-2) to recognize variations in control object presence or motion indicating command information, related information, environmental information and other information discernable from the object, position, motion and attribute information that might be useful in controlling a machine. With reference to FIG. 20-3, virtual construct 198B-1, 198B-2 implement an engagement target with which a control object 99 interacts—enabling MSCS 189 to discern variations in control object (i.e., motions into, out of or relative to virtual construct 198B) as indicating control or other useful information. A gesture trainer 198C and gesture properties extractor 198D provide functionality to define, build and/or customize gesture properties 198A.

A context determiner 198G and object of interest determiner 198H provide functionality to determine from the object, position, motion and attribute information objects of interest (e.g., control objects, or other objects to be modeled and analyzed), objects not of interest (e.g., background) based upon a detected context. For example, when the context is determined to be an identification context, a human face will be determined to be an object of interest to the system and will be determined to be a control object. On the other hand, when the context is determined to be a fingertip control context, the finger tips will be determined to be object(s) of interest and will be determined to be a control objects whereas the user's face will be determined not to be an object of interest (i.e., background). Further, when the context is determined to be a styli (or other tool) held in the fingers of the user, the tool tip will be determined to be object of interest and a control object whereas the user's fingertips might be determined not to be objects of interest (i.e., background). Background objects can be included in the environmental information provided to environmental filter 197H of model management module 197.

A virtual environment manager 198E provides creation, selection, modification and de-selection of one or more virtual constructs 198B. In some implementations, virtual constructs (e.g., a virtual object defined in space; such that variations in real objects relative to the virtual construct, when detected, can be interpreted for control or other purposes are used to determine variations (i.e., virtual "contact" with the virtual construct, breaking of virtual contact, motion relative to a construct portion, etc.) to be interpreted as engagements, dis-engagements, motions relative to the construct(s), and so forth, enabling the system to interpret pinches, pokes and grabs, and so forth. Interaction interpretation module 198 provides as output the command information, related information and other information discernable from the object, position, motion and attribute information that might be useful in controlling a machine from recognition engine 198F to an application control system 90D.

Further with reference to FIG. 20, an application control system 90D includes a control module 199 that provides functionality to determine and authorize commands based upon the command and other information obtained from interaction system 90C.

A control module 199 implementation comprises a command engine 199F to determine whether to issue command(s) and what command(s) to issue based upon the command information, related information and other information discernable from the object, position, motion and attribute information, as received from an interaction interpretation module 198. Command engine 199F employs command/control repository 199A (e.g., application commands, OS commands, commands to MSCS, misc. commands) and related information indicating context received from the interaction interpretation module 198 to determine one or more commands corresponding to the gestures, context, etc. indicated by the command information. For example, engagement gestures can be mapped to one or more controls, or a control-less screen location, of a presentation device associated with a machine under control. Controls can include imbedded controls (e.g., sliders, buttons, and other control objects in an application), or environmental level controls (e.g., windowing controls, scrolls within a window, and other controls affecting the control environment). In implementations, controls may be displayed using 2D presentations (e.g., a cursor, cross-hairs, icon, graphical representation of the control object, or other displayable object) on display screens and/or presented in 3D forms using holography, projectors or other mechanisms for creating 3D presentations, or audible (e.g., mapped to sounds, or other mechanisms for conveying audible information) and/or touchable via haptic techniques.

Further, an authorization engine 199G employs biometric profiles 199B (e.g., users, identification information, privileges, etc.) and biometric information received from the interaction interpretation module 198 to determine whether commands and/or controls determined by the command engine 199F are authorized. A command builder 199C and biometric profile builder 199D provide functionality to define, build and/or customize command/control repository 199A and biometric profiles 199B.

Selected authorized commands are provided to machine(s) under control (i.e., "client") via interface layer 196. Commands/controls to the virtual environment (i.e., interaction control) are provided to virtual environment manager 198E. Commands/controls to the emission/detection systems (i.e., sensory control) are provided to emission module 91 and/or detection module 92 as appropriate.

Figure 23:
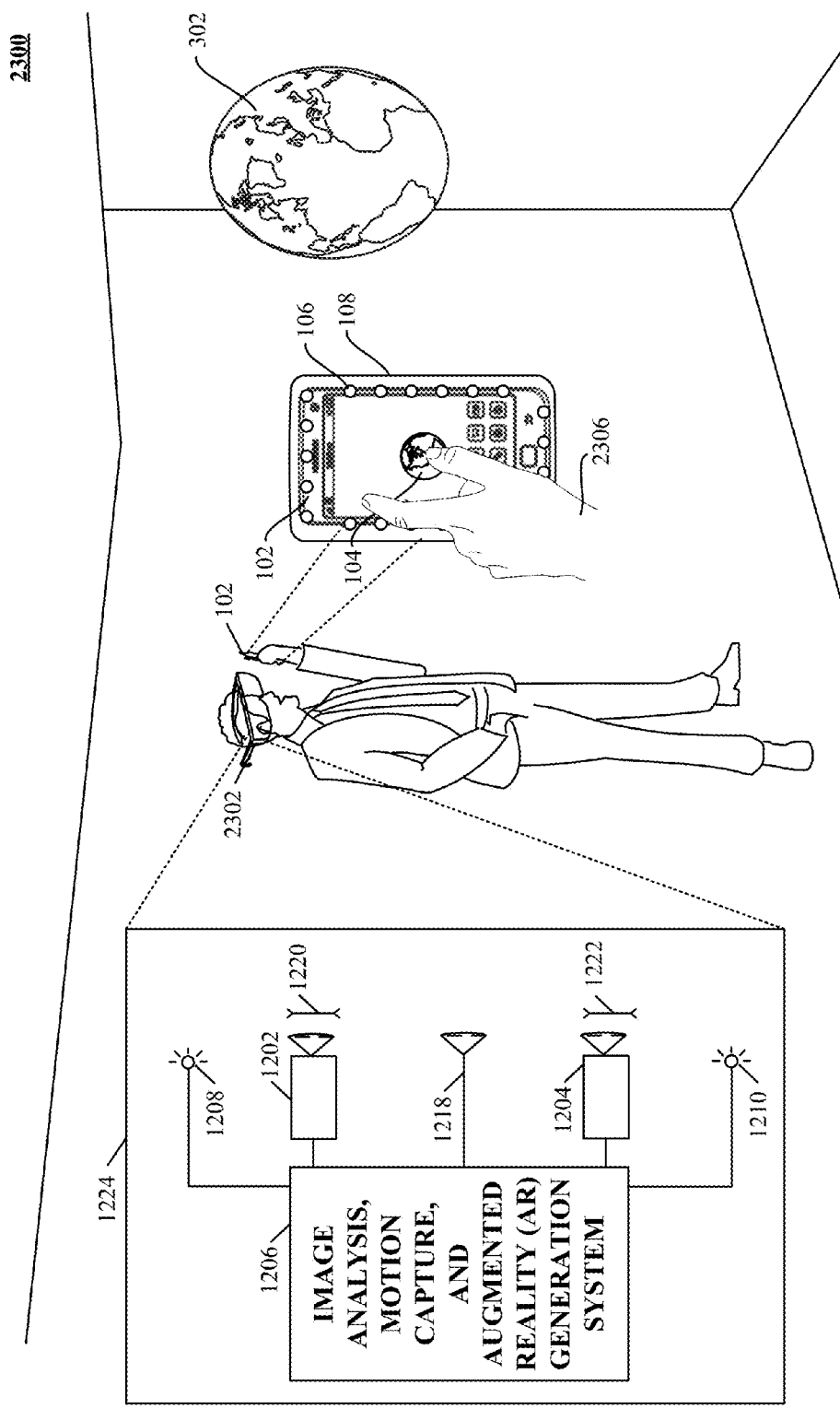
FIG. 23 depicts one implementation of a personal head mounted display (HMD) used to generate a virtual object that is manipulated by a virtual control of a smart phone device.

FIG. 23 depicts one implementation 2300 of a personal head mounted display (HMD) 2302 used to generate a virtual object 302 that is manipulated by a virtual control 104 of a smart phone device 102. System 1224 is preferably coupled to a wearable device 2302 that can be a personal head mounted display (HMD) having a goggle form factor such as shown in FIG. 23, a helmet form factor, or can be incorporated into or coupled with a watch, smartphone, or other type of portable device.

In various implementations, the systems and methods of interacting with a virtual object as described herein can be integrated with other applications, such as a head-mounted device or a mobile device. Referring again to FIG. 23, a head-mounted device 2302 can include an optical assembly that displays a surrounding environment or a virtual environment to the user; incorporation of the motion-capture system 1224 in the head-mounted device FIG. 23 allows the user to interactively control the displayed environment. For example, a virtual environment can include virtual objects that can be manipulated by the user's hand gestures, which are tracked by the motion-capture system 1224. In one implementation, the motion-capture system 1224 integrated with the head-mounted device 2302 detects a position and shape of user's hand and projects it on the display of the head-mounted device 2302 such that the user can see her gestures and interactively control the objects in the virtual environment. This can be applied in, for example, gaming or internet browsing.

In one implementation, information about the interaction with the virtual object 302 can be shared by a first HMD user with a HMD of a second user. For instance, a team of surgeons can collaborate by sharing with each other virtual incisions to be performed on a patient. In some implementations, this is achieved by sending to the second user the information about the virtual object, including primitive(s) indicating at least one of a type, size, and/or features and other information about the calculation point(s) used to detect the interaction. In other implementations, this is achieved by sending to the second user information about the predictive model used to track the interaction.

One implementation uses motion sensors and/or other types of sensors coupled to a motion-capture system to monitor motions within a real environment. A virtual object integrated into an augmented rendering of a real environment can be projected to a user of a portable device. Motion information of a user body portion can be determined based at least in part upon sensory information received from imaging or acoustic or other sensory devices. Control information is communicated to a system based in part on a combination of the motion of the portable device and the detected motion of the user determined from the sensory information received from imaging or acoustic or other sensory devices. The virtual device experience can be augmented in some implementations by the addition of haptic, audio and/or other sensory information projectors. For example, an optional video projector can project an image of a page (e.g., virtual device) from a virtual book object superimposed upon a real world object, e.g., desk being displayed to a user via live video feed; thereby creating a virtual device experience of reading an actual book, or an electronic book on a physical e-reader, even though no book nor e-reader is present. Optional haptic projector can project the feeling of the texture of the "virtual paper" of the book to the reader's finger. Optional audio projector can project the sound of a page turning in response to detecting the reader making a swipe to turn the page. Because it is a virtual reality world, the back side of hand is projected to the user, so that the scene looks to the user as if the user is looking at the user's own hand(s).

Particular Implementations

The methods described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as pervasive computing environment, handheld mode, wide-area mode, augmented reality, embedding architectures, rigged hand, biometrics, etc.

These methods can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, these methods is described with reference to the system that carries out a method. The system is not necessarily part of the method.

Other implementations of the methods described in this section can include a non-transitory computer readable storage medium storing instructions executable by a processor to perform any of the methods described above. Yet another implementation of the methods described in this section can include a system including memory and one or more processors operable to execute instructions, stored in the memory, to perform any of the methods described above.

Some example implementations are listed below with certain implementations dependent upon the implementation to which they refer to:

1. A method of interacting with a virtual object, the method including:
   referencing a virtual object in an augmented reality space;
   identifying a physical location of a device in at least one image of the augmented reality space;
   generating for display a control coincident with a surface of the device;
   sensing interactions between at least one control object and the control coincident with the surface of the device; and
   generating data signaling manipulations of the control coincident with the surface of the device.
2. The method of implementation 1, wherein the control object is a hand.
3. The method of implementation 2, wherein the control object is a portion of the hand.
4. The method of implementation 1, wherein the control object is a tool.
5. The method of implementation 1, wherein the control object is a combination of a hand and a tool.
6. The method of implementation 1, further including:
   virtually superimposing the control coincidentally with the surface of the device.
7. The method of implementation 1, further including:
   generating data representing the control across an interface of the device.
8. The method of implementation 1, wherein the device is a smartphone.
9. The method of implementation 1, further including:
   sensing interactions between the control object and the control coincident with the surface of the device when the control object touches the control.
10. The method of implementation 1, further including:
    sensing interactions between the control object and the control coincident with the surface of the device when the control object approaches the control within an initial hover proximity threshold.
11. The method of implementation 1, further including:
    emphasizing, in the augmented reality space, points of interaction between extremities of the device and the control coincident with the surface of the device.
12. The method of implementation 1, wherein the manipulations of the control coincident with the surface of the device are indicative of manipulations of the virtual object.
13. The method of implementation 1, wherein the virtual object in the augmented reality space is responsive to the manipulations of the control coincident with the surface of the device.
14. The method of implementation 1, further including:
    sensing interactions between the control object and the control coincident with the surface of the device using at least one phase conjugate component that creates a contrast between portions of the control object and rest of the augmented reality space.
15. The method of implementation 1, wherein the phase conjugate component is a retro-reflector.
16. The method of implementation 1, further including:
    sensing gestures in a three-dimensional (3D) sensory space away from the surface and proximate to the virtual object using a motion sensory control device; and generating data signaling manipulations of the virtual object in the augmented reality space responsive to the gestures.
17. The method of implementation 1, further including:
    generating data virtually emphasizing at least part of the control object in the augmented reality space.
18. The method of implementation 1, further including:
    generating data virtually representing the control object in the augmented reality space.
19. A system of interacting with a virtual object, the system including:

a processor and a computer readable storage medium storing computer instructions configured to cause the processor to:

reference a virtual object in an augmented reality space;

identify a physical location of a device in at least one image of the augmented reality space;

generate for display a control coincident with a surface of the device;

sense interactions between at least one control object and the control coincident with the surface of the device; and generate data signaling manipulations of the control coincident with the surface of the device.

20. The system of implementation 19, wherein the control object is a hand.

21. The system of implementation 20, wherein the control object is a portion of the hand.

22. The system of implementation 19, wherein the control object is a tool.

23. The system of implementation 19, wherein the control object is a combination of a hand and a tool.

24. The system of implementation 19, further configured to:
virtually superimpose the control coincidentally with the surface of the device.

25. The system of implementation 19, further configured to:
generate data representing the control across an interface of the device.

26. The system of implementation 19, wherein the device is a smartphone.

27. The system of implementation 19, further configured to:
sense interactions between the control object and the control coincident with the surface of the device when the control object touches the control.

28. The system of implementation 19, further configured to:
sense interactions between the control object and the control coincident with the surface of the device when the control object approaches the control within an initial hover proximity threshold.

29. The system of implementation 19, further configured to:
emphasize, in the augmented reality space, points of interaction between extremities of the device and the control coincident with the surface of the device.

30. The system of implementation 19, wherein the manipulations of the control coincident with the surface of the device are indicative of manipulations of the virtual object.

31. The system of implementation 19, wherein the virtual object in the augmented reality space is responsive to the manipulations of the control coincident with the surface of the device.

32. The system of implementation 19, further configured to:
sense interactions between the control object and the control coincident with the surface of the device using at least one phase conjugate component that creates a contrast between portions of the control object and rest of the augmented reality space.

33. The system of implementation 19, wherein the phase conjugate component is a retro-reflector.

34. The system of implementation 1, further configured to:
sense gestures in a three-dimensional (3D) sensory space away from the surface and proximate to the virtual object using a motion sensory control device; and generate data signaling manipulations of the virtual object in the augmented reality space responsive to the gestures.

35. The system of implementation 19, further configured to:
generate data virtually emphasizing at least part of the control object in the augmented reality space.

36. The system of implementation 19, further configured to:
generate data virtually representing the control object in the augmented reality space.

37. A non-transitory machine readable medium, storing one or more instructions which when executed by one or more processors cause the one or more processors to perform the following:

reference a virtual object in an augmented reality space;

identify a physical location of a device in at least one image of the augmented reality space;

generate for display a control coincident with a surface of the device;

sense interactions between at least one control object and the control coincident with the surface of the device; and generate data signaling manipulations of the control coincident with the surface of the device.

38. The machine readable medium of implementation 37, wherein the control object is a hand.

39. The machine readable medium of implementation 38, wherein the control object is a portion of the hand.

40. The machine readable medium of implementation 37, wherein the control object is a tool.

41. The machine readable medium of implementation 37, wherein the control object is a combination of a hand and a tool.

42. The machine readable medium of implementation 37, further configured to:
virtually superimpose the control coincidentally with the surface of the device.

43. The machine readable medium of implementation 37, further configured to:
generate data representing the control across an interface of the device.

44. The machine readable medium of implementation 37, wherein the device is a smartphone.

45. The machine readable medium of implementation 37, further configured to:
sense interactions between the control object and the control coincident with the surface of the device when the control object touches the control.

46. The machine readable medium of implementation 37, further configured to:
sense interactions between the control object and the control coincident with the surface of the device when the control object approaches the control within an initial hover proximity threshold.

47. The machine readable medium of implementation 37, further configured to:
emphasize, in the augmented reality space, points of interaction between extremities of the device and the control coincident with the surface of the device.

48. The machine readable medium of implementation 37, wherein the manipulations of the control coincident with the surface of the device are indicative of manipulations of the virtual object.

49. The machine readable medium of implementation 37, wherein the virtual object in the augmented reality space is responsive to the manipulations of the control coincident with the surface of the device.

50. The machine readable medium of implementation 37, further configured to:
sense interactions between the control object and the control coincident with the surface of the device using at least one phase conjugate component that creates a contrast between portions of the control object and rest of the augmented reality space.

51. The machine readable medium of implementation 37, wherein the phase conjugate component is a retro-reflector.

52. The machine readable medium of implementation 1, further configured to:
sense gestures in a three-dimensional (3D) sensory space away from the surface and proximate to the virtual object using a motion sensory control device; and
generate data signaling manipulations of the virtual object in the augmented reality space responsive to the gestures.

53. The machine readable medium of implementation 37, further configured to:
generate data virtually emphasizing at least part of the control object in the augmented reality space.

54. The machine readable medium of implementation 37, further configured to:
generate data virtually representing the control object in the augmented reality space.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method of interacting with a virtual object in an augmented reality environment using a head mounted device and at least one control object for gesture control, the method including:
   identifying a physical location of a device in at least one image of an augmented reality space;
   generating for display, in the augmented reality space and by the head mounted device, a virtual control coincident with and superimposed upon a surface of the device;
   sensing interactions between at least one control object and the virtual control coincident with and superimposed upon the surface of the device;
   generating data signaling manipulations of the virtual object for display by the head mounted device in the augmented reality space, the data being generated based upon the sensed interactions between the at least one control object and the virtual control coincident with and superimposed upon the surface of the device; and
   emphasizing, in the augmented reality space and by the head mounted device, points of interaction between extremities of the device and the virtual control generated for display by the head mounted device.

2. The method of claim 1, wherein the control object is a hand.

3. The method of claim 2, wherein the control object is a portion of the hand.

4. The method of claim 1, wherein the control object is a tool.

5. The method of claim 1, wherein the control object is a combination of a hand and a tool.

6. The method of claim 1, further including generating data representing the virtual control across an interface of the device.

7. The method of claim 1, wherein the device is a smartphone.

8. The method of claim 1, further including sensing interactions between the control object and the virtual control coincident with and superimposed upon the surface of the device when the control object touches the virtual control.

9. The method of claim 1, further including sensing interactions between the control object and the virtual control generated for display by the head mounted device the interactions being sensed when the control object approaches the virtual control generated for display by the head mounted device within an initial hover proximity threshold.

10. The method of claim 1, wherein the virtual object generated for display by the head mounted device in the augmented reality space is responsive to the manipulations of the virtual control generated for display by the head mounted device in the augmented reality space.

11. The method of claim 1, further including sensing interactions between the control object and the virtual control generated for display by the head mounted device, the interactions being sensed using at least one phase conjugate component that creates a contrast between portions of the control object and a rest of the augmented reality space.

12. The method of claim 11, wherein the at least one phase conjugate component is a retro-reflector.

13. The method of claim 1, further including:
    sensing gestures in a three-dimensional (3D) sensory space away from the surface and proximate to the virtual object using a motion sensory control device; and
    generating data signaling manipulations of the virtual object in the augmented reality space responsive to the gestures.

14. The method of claim 1, further including:
    generating data virtually emphasizing at least part of the control object in the augmented reality space.

15. The method of claim 1, further including:
    generating data virtually representing the control object in the augmented reality space.

16. A system of interacting with a virtual object in an augmented reality environment using a head mounted device and at least one control object for gesture control, the system including:
    a processor and a computer readable storage medium storing computer instructions configured to cause the processor to:
    identify a physical location of a device in at least one image of an augmented reality space;
    generate for display, in the augmented reality space and by the head mounted device, a virtual control coincident with and superimposed upon a surface of the device;
    sense interactions between at least one control object and the virtual control coincident with and superimposed upon the surface of the device;

generate data signaling manipulations of the virtual object for display by the head mounted device in the augmented reality space, the data being generated based upon the sensed interactions between the at least one control object and the virtual control coincident with and superimposed upon the surface of the device; and emphasize, in the augmented reality space and by the head mounted device, points of interaction between extremities of the device and the virtual control generated for display by the head mounted device.

17. A non-transitory machine readable medium, storing one or more instructions for interacting with a virtual object in an augmented reality environment using a head mounted device and at least one control object for gesture control, the instructions when executed by one or more processors cause the one or more processors to perform the following:

identify a physical location of a device in at least one image of an augmented reality space;

generate for display, in the augmented reality space and by the head mounted device, a virtual control coincident with and superimposed upon a surface of the device;

sense interactions between at least one control object and the virtual control coincident with and superimposed upon the surface of the device;

generate data signaling manipulations of the virtual object for display by the head mounted device in the augmented reality space, the data being generated based upon the sensed interactions between the at least one control object and the virtual control coincident with and superimposed upon the surface of the device; and emphasize, in the augmented reality space and by the head mounted device, points of interaction between extremities of the device and the virtual control generated for display by the head mounted device.

18. The method of claim 1, further comprising:

identifying, by the head mounted device, a real world item other than the device;

determining, based on the identified real world item, a specific virtual control that corresponds to the identified real world item; and implementing the specific virtual control as the virtual control coincident with and superimposed upon the surface of the device.

19. The method of claim 1, further comprising:

identifying, by the head mounted device, a physical environment in which the head mounted device resides;

determining, based on the identified physical environment, a specific virtual control that corresponds to the identified physical environment; and implementing the specific virtual control as the virtual control coincident with and superimposed upon the surface of the device.

20. A method of interacting with a virtual object in an augmented reality environment using a head mounted device and at least one control object for gesture control, the method comprising:

identifying a physical location of a device in at least one image of an augmented reality space;

generating for display, in the augmented reality space and by the head mounted device, a virtual control coincident with and superimposed upon a surface of the device sensing interactions between at least one control object and the virtual control coincident with and superimposed upon the surface of the device;

generating data signaling manipulations of the virtual object for display by the head mounted device in the augmented reality space, the data being generated based upon the sensed interactions between the at least one control object and the virtual control coincident with and superimposed upon the surface of the device;

identifying, by the head mounted device, an item displayed by an embedded display of the device;

determining, based on the identified item, a specific virtual control that corresponds to the identified item; and implementing the specific virtual control as the virtual control coincident with and superimposed upon the surface of the device.

21. A system including one or more processors coupled to a memory, the memory loaded with computer instructions to interact with a virtual object in an augmented reality environment using a head mounted device and at least one control object for gesture control, the instructions, when executed on the processors, implement the method of claim 20.

22. A non-transitory computer-readable storage medium impressed with computer program instructions to interact with a virtual object in an augmented reality environment using a head mounted device and at least one control object for gesture control, the instructions, when executed on a processor, implement the method of claim 20.

* * * * *